Nov. 19, 1957 A. D. SCARBROUGH 2,813,677

HIGH SPEED COUNTER

Filed Jan. 26, 1951 8 Sheets-Sheet 1

INVENTOR.
ALFRED D. SCARBROUGH.
BY Nicholas T Volk
atty

INVENTOR.
ALFRED D. SCARBROUGH.
BY
Nicholas T Volk
atty

INVENTOR.
ALFRED D. SCARBROUGH.
BY Nicholas T Volsk
atty

Nov. 19, 1957 A. D. SCARBROUGH 2,813,677

HIGH SPEED COUNTER

Filed Jan. 26, 1951 8 Sheets-Sheet 4

INVENTOR.
ALFRED D. SCARBROUGH.
BY Nicholas T Volk
atty

INVENTOR.
ALFRED D. SCARBROUGH.
BY Nicholas T Volsk
atty

INVENTOR.
ALFRED D. SCARBROUGH.
BY Nicholas T Volk
atty

INVENTOR.
ALFRED D. SCARBROUGH.
BY Nicholas T Volk
atty

Nov. 19, 1957 A. D. SCARBROUGH 2,813,677

HIGH SPEED COUNTER

Filed Jan. 26, 1951 8 Sheets-Sheet 8

INVENTOR.
ALFRED D. SCARBROUGH.
BY Nicholas T Volsk
atty

United States Patent Office 2,813,677

Patented Nov. 19, 1957

2,813,677

HIGH SPEED COUNTER

Alfred D. Scarbrough, Los Angeles, Calif., assignor, by mesne assignments, to Hughes Aircraft Company, a corporation of Delaware Application January 26, 1951, Serial No. 208,012

21 Claims. (Cl. 235—92)

This invention relates to high speed counters and more particularly to high speed counters which indicate by electrical output signals the total rotational count of a revolving shaft at substantially any instant.

Counters of the type herein disclosed may be used in a variety of systems. One of the more important uses contemplated for these counters is their application to a class of computer systems which perform computations on information contained in the total number of revolutions of a revolving shaft. These computer systems, in general, are able to utilize this shaft information only when the number of revolutions is expressed by electrical signals. Thus, the counters contemplated by this invention have particular utility when their outputs are applied to this class of computers.

A majority of the known counters capable of producing the total rotational count of a revolving shaft in electrical signals consist of Geneva gearing systems having electrical contactors and a potential source. However, certain difficulties have arisen in utilizing Geneva gearing systems as a basic constituent of this type of counter. In operation, a counting system utilizing Geneva gearing has periods of intermittent motion caused by its gear elements being in motion during the time interval of change from one digit indication to another, and being stationary during the time interval of no change in digit indication. This intermittent motion of the gear elements involved increases considerably the wear between the meshing gear elements which, in turn, produces a proportionately greater amount of play or lost motion between the individual sections of the Geneva system counter. The additive effects of the individual lost motion variances between adjacent sections result in progressively greater amounts of angular misalignment between the electrical contactors of the first and succeeding sections. When the angular misalignment between any two of the electrical contactors becomes too great, the output from a Geneva system type of counter will be ambiguous and thus inaccurate. This imposes a limitation on the number of sections which may be joined together to form a complete counter while maintaining the limits of the counter's operational accuracy. This limitation of the total number of sections in a like manner limits the highest count which may be produced by the counter.

Other high speed counters have been devised which overcome these inherent limitations of the Geneva gearing system. Some of these systems employ relay circuits, while other employ solenoid circuits. The circuits of such systems are necessarily quite complicated, and the speed of counting is limited by the speed response of the various relays and solenoids utilized. Also, such systems, besides lacking simplicity, are relatively expensive to produce and are of considerable size and weight.

This invention provides high speed counters of extremely simple design which overcome the limitations of the Geneva gearing system, and also present a considerable improvement over the counters utilizing relays and solenoids. This simplicity of design, besides reducing the size and the expense involved, also permits certain advantages with respect to the speed of operation and accuracy which are not attainable in the other known counting systems. Also, the accuracy of operation of the counters of this invention is not affected by any lost motion that may be present in the gearing systems employed in the counter.

According to the basic concept of the present invention, the high-speed counters include a plurality of counting stages which produce a composite electrical output signal corresponding to the successive digits of the digital or numerical equivalent of the rotational position of the rotatable shaft without permitting ambiguous indications or readings when the output signals from the higher order counting stages are changing from one value to another.

More specifically, the first counting stage includes a switching element actuable by rotation of the shaft to present an electrical output signal which varies in accordance with rotation of the shaft to indicate the magnitude of the least significant digit of the numerical equivalent of the rotational position of the shaft. Each of the succeeding counting stages, on the other hand, includes a switching element actuable by rotation of the shaft and selectively energizable to provide at least two different paths for presenting two output signals which are shifted in phase with respect to the output signal from the first counting unit and which are indicative of the magnitude of the corresponding digit of the numerical equivalent of the shaft position. The particular path utilized to present the output signal from any one of the higher order counting stages is determined by the instantaneous voltage level of the output signal from the preceding counting stage, or more specifically, by the positions of the switching elements in all of the lower order counting stages. Accordingly, each digit of the entire numerical count represented by the output signals from the counting stages is properly changed simultaneous with and under the control of changes in the least significant digit of the numerical count. Stated differently, as the shaft is rotated, any changes in the higher order digits of the numerical count take place simultaneous with changes in the lowest order digit of the count by selective energization of a different path in the higher order units for presenting an output signal indicative of the new digit of the count.

It is, therefore, an object of this invention to provide high speed counters, each of which is of simple, light, and compact design for counting the total number of rotations of a revolving shaft in a particular *r*-radix number system, and presenting this total count as nonambiguous electrical output signals.

Another object of this invention is to provide high speed counters for indicating by electrical output signals the total number of revolutions of a revolving shaft; the counters thus provided being unaffected in their operational accuracy because of any possible lost motion present in their gearing systems.

Another object of this invention is to provide high speed counters which indicate by electrical output signals, during a substantial portion of each revolution of a revolving shaft, the total number of revolutions made by the shaft, and which fail to indicate this number during only an inconsequential portion of each revolution.

Another object of this invention is to provide high speed counters applicable to computer devices for producing electrical output signals representing the total number of revolutions of a revolving shaft, and which also produce additional electrical warning signals during the time interval of each shaft revolution that an incorrect count is produced by the counter so that the computer device may be warned of such an incorrect count.

Another object of this invention is to provide counters which indicate by electrical output signals the total number of revolutions of a revolving shaft, and whose accuracy of operation is maintained over a relatively wide speed range of the revolving shaft.

It is another object of this invention to provide a high speed counter employing electrical commutation means which indicates by electrical output signals corresponding to digits in the binary number system the total number of rotations of a revolving shaft.

Another object of this invention is to provide a high speed counter employing cam switching arrangements which indicates by electrical output signals corresponding to digits in the binary number system the total number of shaft revolutions of a revolving shaft.

Another object of this invention is to provide a high speed counter having electrical commutation means which indicates the total number of shaft revolutions of a revolving shaft by electrical signals corresponding to digits in the decimal number system.

Another object of this invention is to provide a high speed counter having cam operated switching means which indicates the total number of shaft revolutions of a revolving shaft by producing electrical signals corresponding to the number of shaft revolutions expressed in the decimal number system.

Still a further object of this invention is to provide high speed counters employing either electrical commutation or cam operated commutation for counting the total number of revolutions of a revolving shaft in a first number system, and transforming instantaneously this count in the first number system into an equivalent count in a second number system, and presenting the count in the second number system as electrical output signals.

Another object of this invention is to provide counters for counting the total number of shaft rotations of a revolving shaft in any specific *r*-radix number system greater than two, and instantaneously transforming the output signals thereof into signals representing binary numbers equivalent to the original *r*-radix number count.

A further object of this invention is to provide a counter which first counts the total number of shaft revolutions of a revolving shaft in the octal system of numbers, and then instantaneously transforms the octal number into a binary number count equivalent to the octal number count through the use of diode gating circuits.

Another object of this invention is to provide different embodiments of electrical commutation apparatus applicable to various high speed counters which employ electrical commutation as a primary means of performing their respective counting operations.

Another object of this invention is to provide high speed counters, each of which counts the total revolutions of a revolving shaft in a particular *r*-radix number system, and which has internal switching between its individual counting elements performed by mechanical cam switching means.

Another object of this invention is to provide high speed counters, each of which counts the total revolutions of a revolving shaft in a particular *r*-radix number system, and which utilizes electrical commutation for internal switching between its individual counting elements.

Another object of this invention is to provide high speed counters, each of which counts the total revolutions of a revolving shaft in a particular *r*-radix number system, and which utilizes diode gating circuits for internal switching between individual counting elements.

A further object of this invention is to provide a coded decimal counter which indicates by electrical output signals the total number of revolutions of a revolving shaft; the signals corresponding to the decimal coded binary equivalent of the shaft rotational count expressed in the decimal number system.

Another object of this invention is to provide a binary counter employing cam operated switching means which produces electrical output signals indicative of the total number of revolutions of a revolving shaft.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a schematic diagram of one embodiment of a binary counter, according to this invention;

Figs. 2*a* through 2*c* illustrate the embodiment shown in Fig. 1, showing the effects of shaft rotation;

Figures 5, 5A:
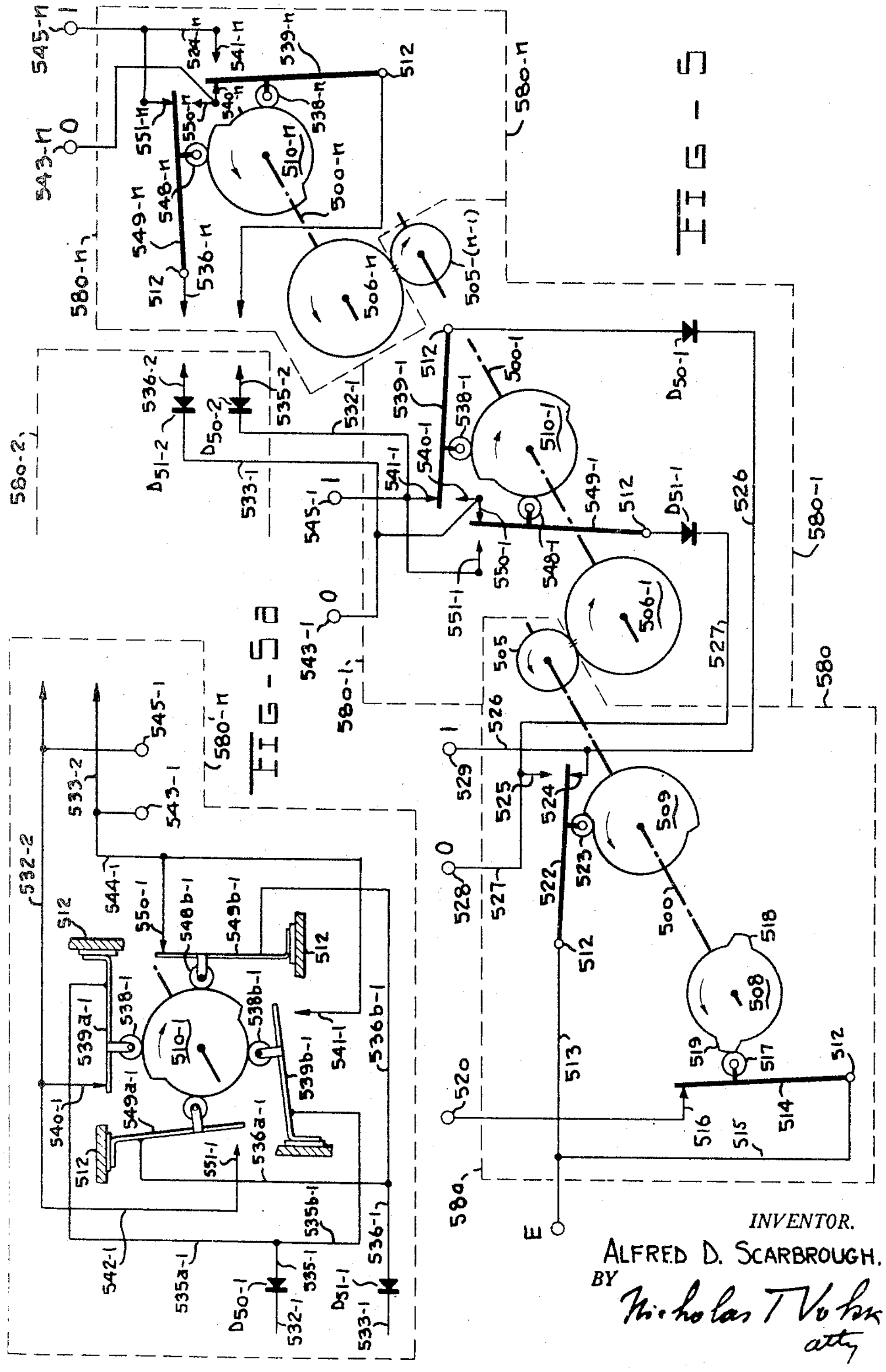
Figure 6:
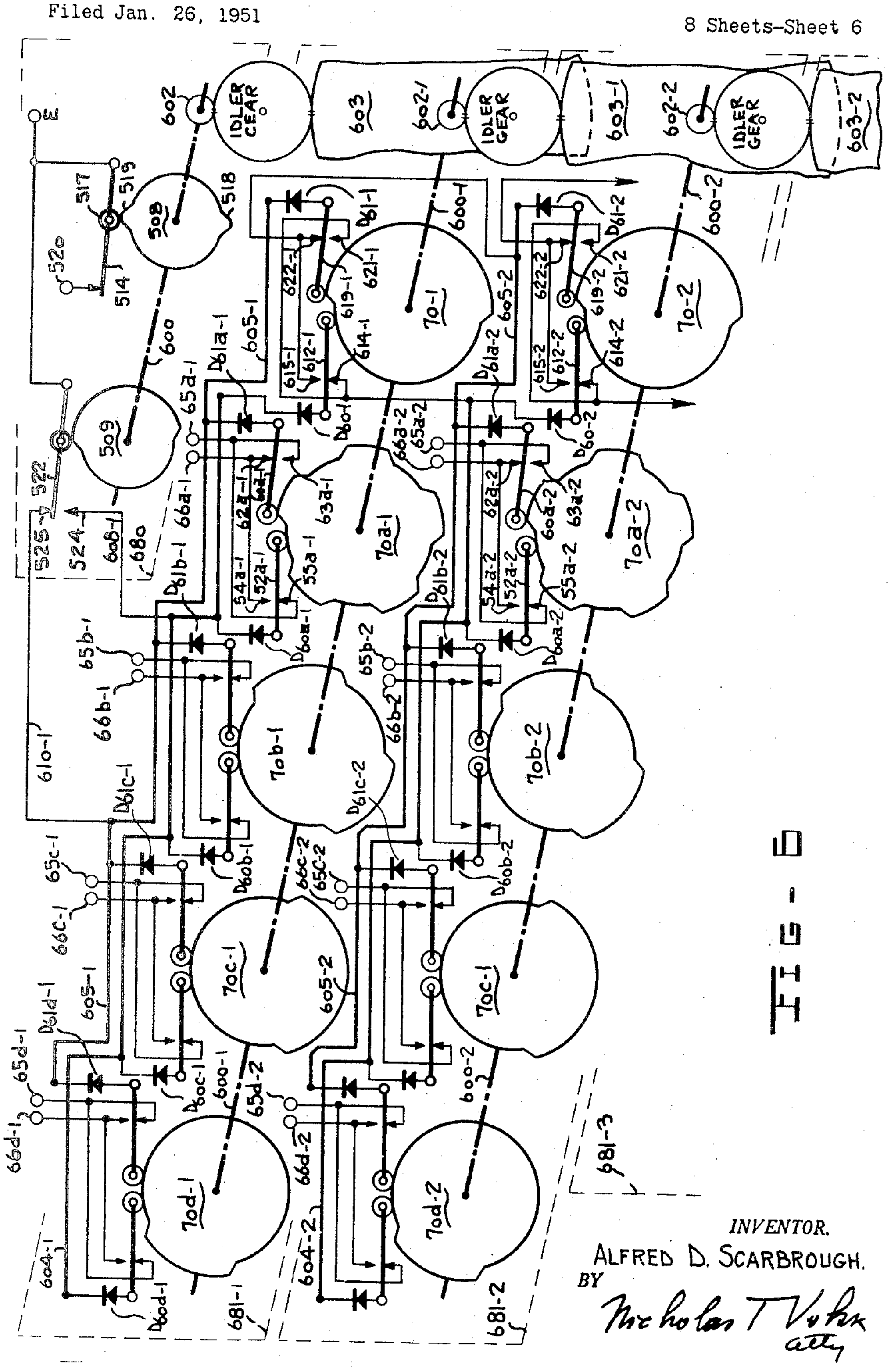
Figure 9:
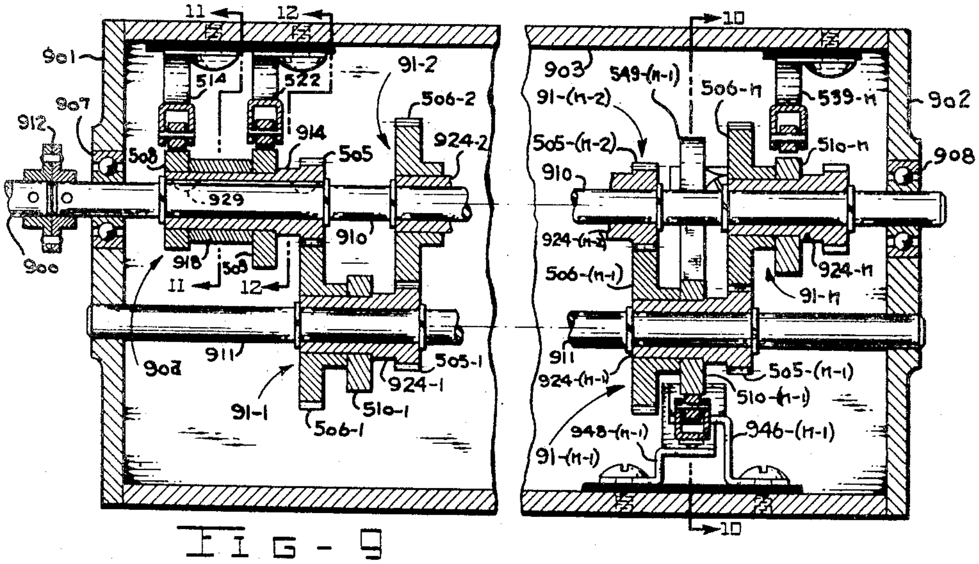
Figure 10:
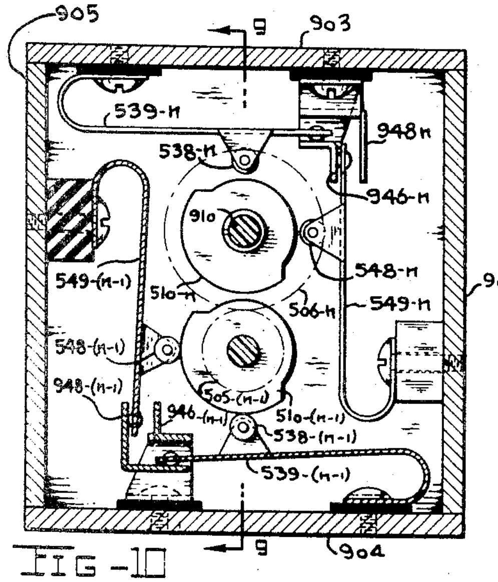
Figure 7:
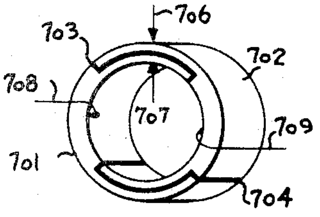
Figure 7A:
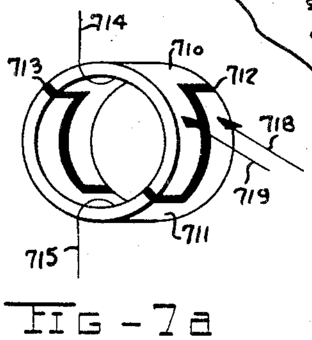
Figures 8, 8A:
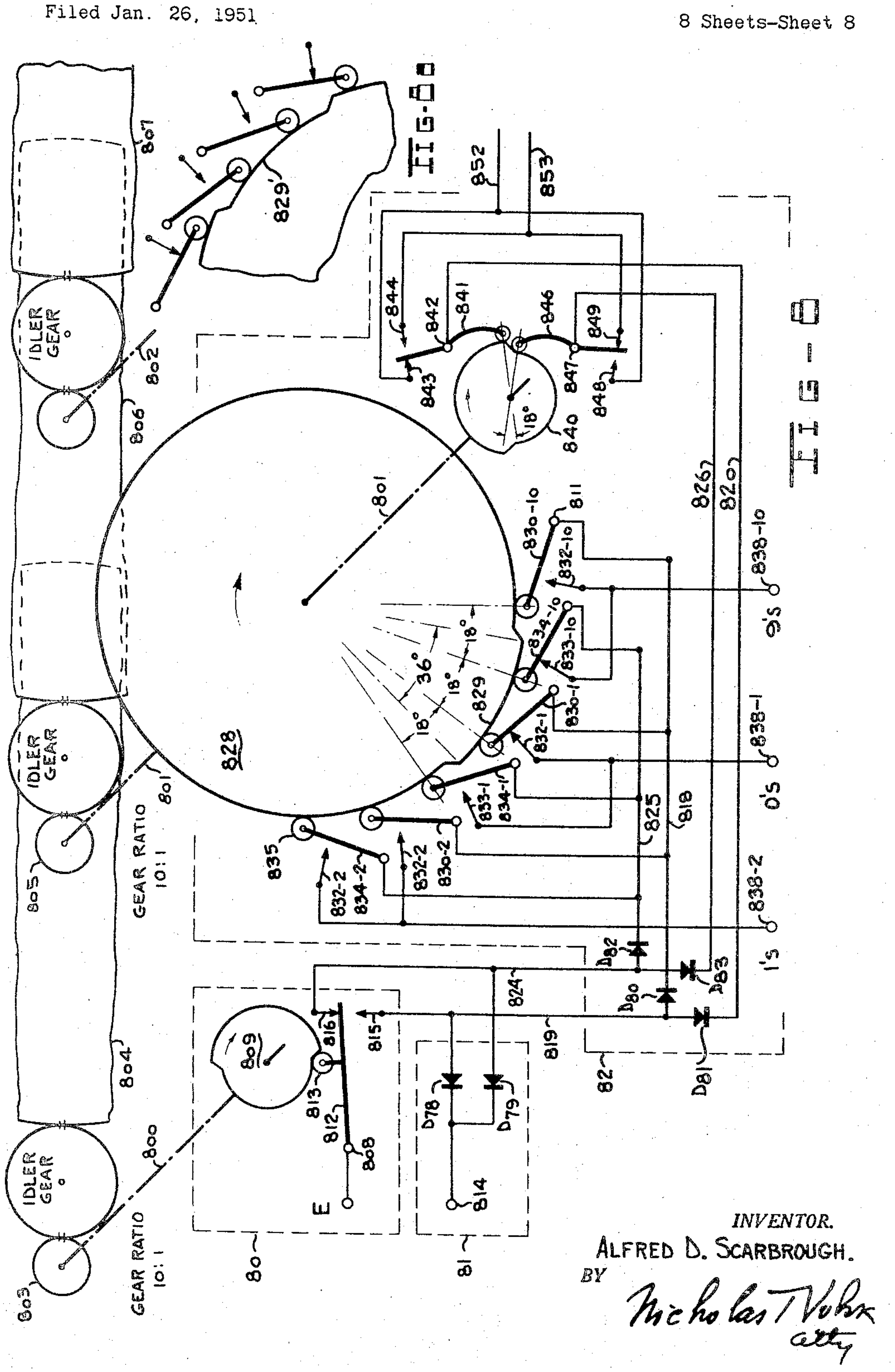

Figs. 5 and 5*a* are schematic diagrams of another embodiment of a binary counter;

Fig. 6 is a schematic diagram of a coded decimal counter embodiment of this invention;

Figs. 7 and 7*a* are schematic diagrams of two different embodiments of counting rings for the binary counters of the present invention;

Fig. 8 is a schematic diagram of a decimal counter embodiment of this invention;

Fig. 9 is a view taken along line 9—9 of Fig. 10 of a binary counter constructed in accordance with Fig. 5.

Fig. 10 is a cross-sectional view taken along line 10—10 of Fig. 9.

Figure 11:
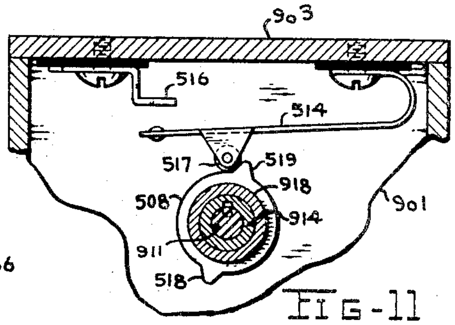

Fig. 11 is a cross-sectional view taken along line 11—11 of Fig. 9.

Figure 12:
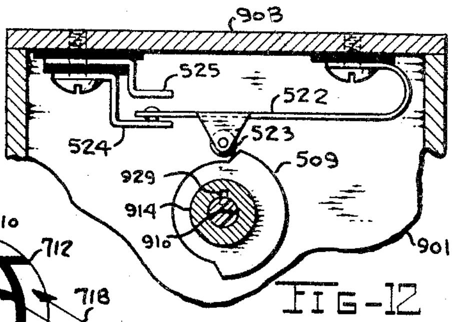

Fig. 12 is a cross-sectional view taken along line 12—12 of Fig. 9.

Figure 1:
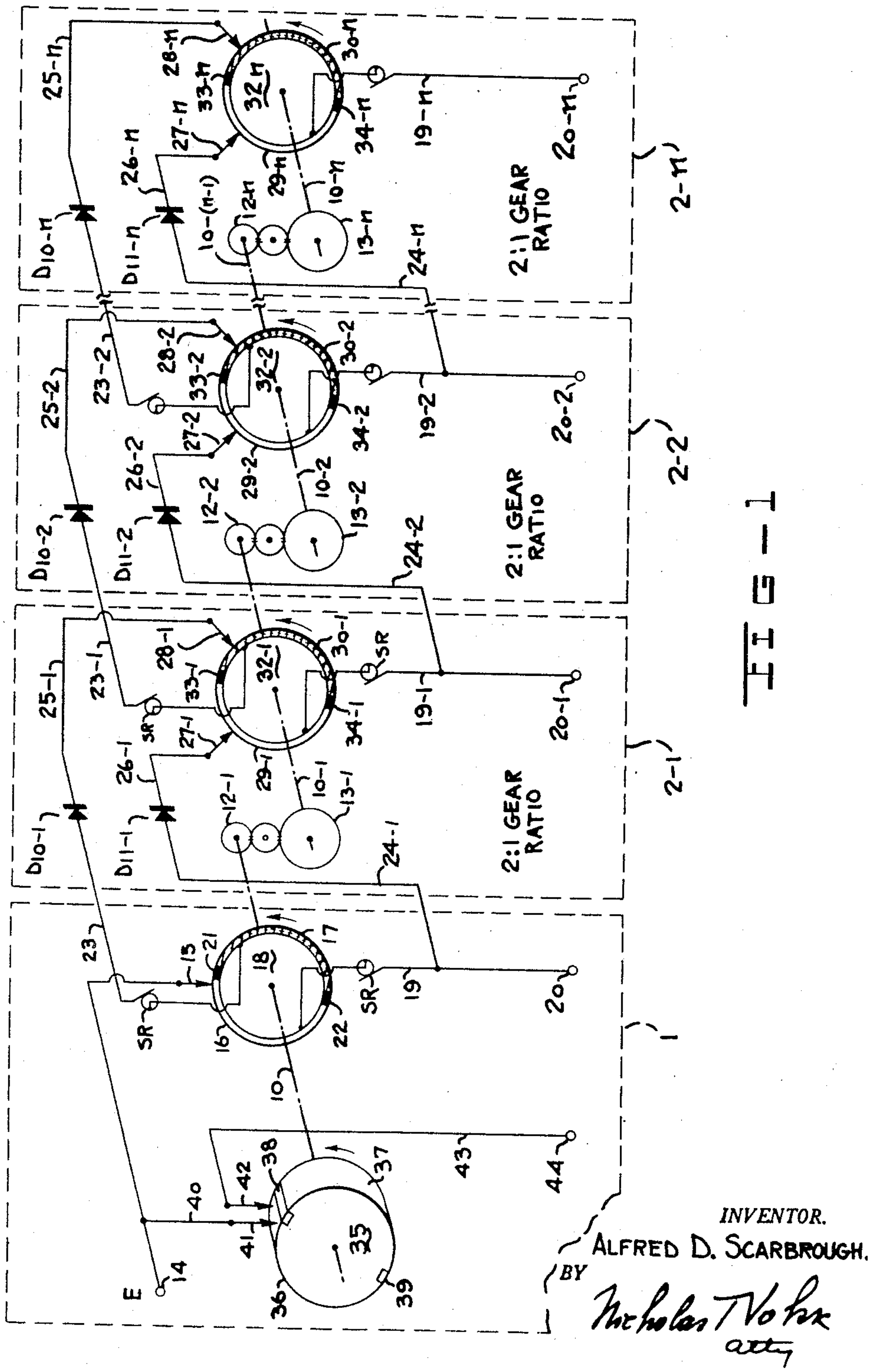

Referring now to the drawings, there is shown in Fig. 1 one type of counter which expresses in the binary system of numbers the number of revolutions of a revolving shaft. The binary system of numbers has two digits, 0 and 1, and may be represented electrically by a voltage E, corresponding to the numeral 1, and an absence of voltage corresponding to the numeral 0. The same rules are followed for counting shaft rotations in the binary system as are followed in the decimal system of numbers, except that only the two digits, 0 and 1, are employed. The sequence of 0, 1, 10, 11, 100, 101, etc. is followed in counting by binary numbers; the sequence corresponding, respectively, to the numerals 0, 1, 2, 3, 4, 5, etc. in the decimal system of numbers.

The rotating shaft whose rotational count is desired is indicated schematically by the reference numeral 10. A switching ring 18 and a warning impulse ring 35 of a switching unit 1 are attached to and rotated at the same speed as shaft 10. Impulse warning ring 35 and its associated circuitry is an auxiliary device having particular utility when the counter output is applied to a computer. Its structure and function will be described in detail after the operation and structure of the counter portion of Fig. 1 has been set forth.

It is to be understood, of course, that shaft 10 may be the actual shaft on which the rotational count is being made, or may be a shaft which is built into the counter and which is coupled to an external shaft whose rotational count is desired. Moreover, it is clear that shaft 10 may be driven by direct coupling at the same speed as the external shaft the rotational count of which is desired, or may be driven by the shaft at a speed proportional to the shaft speed by utilizing an external speed amplification or reduction unit. This last application has particular utility when it is desired to utilize the present invention for producing signals corresponding to a predetermined scale factor times the rotational speed of the external rotating shaft.

A voltage source E, not shown, is connected at a terminal 14 and is applied to a brush 15 contacting switching ring 18. Switching ring 18 is composed of two commutator sections 16 and 17, respectively, electrically insulated from each other by two dielectric inserts 21 and 22. Commutator section 17 of switching ring 18 is connected by a conductor 23, a diode $D_{10-1}$ and a conductor 25–1 in series to a brush 28–1 contacting a counting ring 32–1 in a first counting unit 2–1. Commutator section 16 of switching ring 18 is connected to a first output terminal 20 by a conductor 19, and is also connected to a brush 27–1 contacting counting ring 32–1 by a conductor 24–1, a diode $D_{11-1}$, and a conductor 26–1.

Counting ring 32–1 is similar in structure to switching ring 18 and consists of two commutator sections 29–1 and 30–1 electrically insulated from each other by two dielectric inserts 33–1 and 34–1. Counting ring 32–1 is mounted on a shaft 10–1 which includes a driven gear 13–1 in meshing arrangement with an idler gear driven, in turn, by a driving gear 12–1 mounted on shaft 10. By utilizing a 2:1 speed reduction ratio between gears 12–1 and 13–1, counting ring 32–1 is driven at ½ the speed of switching ring 18, and due to the idler gear between gears 12–1 and 13–1, counting ring 32–1 is driven in the same direction of rotation as is switching ring 18. Commutator section 29–1 of counting ring 32–1 is connected to an output terminal 20–1 by a conductor 19–1, and is also connected to a brush 27–2 contacting a counting ring 32–2 of a succeeding counting unit 2–2 by a conductor 24–2, a diode $D_{11-2}$, and a conductor 26–2, in series. Commutator section 30–1 is connected to a brush 28–2 contacting counting ring 32–2 by a conductor 23–1, a diode $D_{10-2}$, and a conductor 25–2, in series.

Counting ring 32–2 of counting unit 2–2 is mounted on a shaft 10–2, and is driven at one-half the speed of counting ring 32–1 by utilizing a 2:1 speed ratio between gear 12–2, mounted on shaft 10–1, and gear 13–2 mounted on shaft 10–2. The connections for the counting ring 32–2 in counting unit 22 are identical to the connections shown and described for the preceding counting ring 32–1 in counting unit 2–1.

The connections from conductor 23 to commutator section 17 and from conductor 19 to commutator section 16 of counting ring 18 are through the slip rings SR. In a like manner, other commutator sections of the counting rings in the various counting units are connected by slip rings, SR, to their respective conductors. These slip rings, SR, are shown in a schematic manner and represent any conventional variety of slip ring known and used in the electrical commutation art.

The number of counting units in the counter is determined by the maximum count of shaft revolutions desired. A final counting unit **2–*n* includes a counting ring 32–*n* connected to shaft 10–*n* which is driven through its gear 13–*n* by gear 12–*n* attached to a shaft 10–**$(n-1)$. This final counting ring rotates at a speed of $$\frac{1}{2^{(n-1)}}$$

times the speed of the original shaft 10.

Figure 2A:
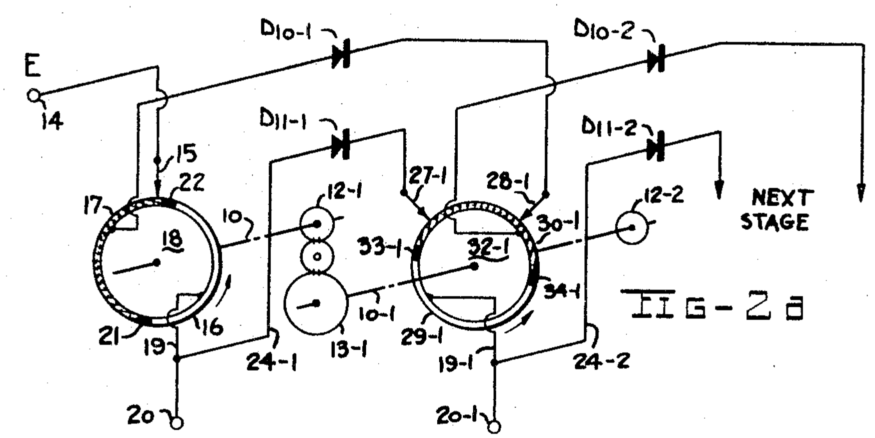
Figure 2B:
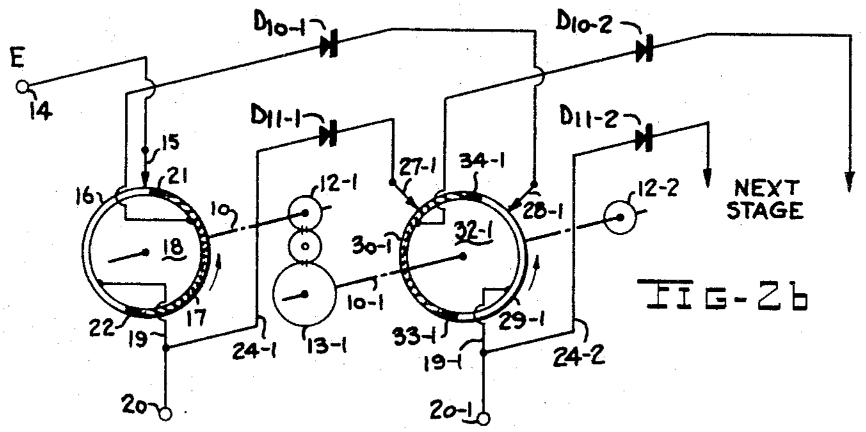
Figure 2C:
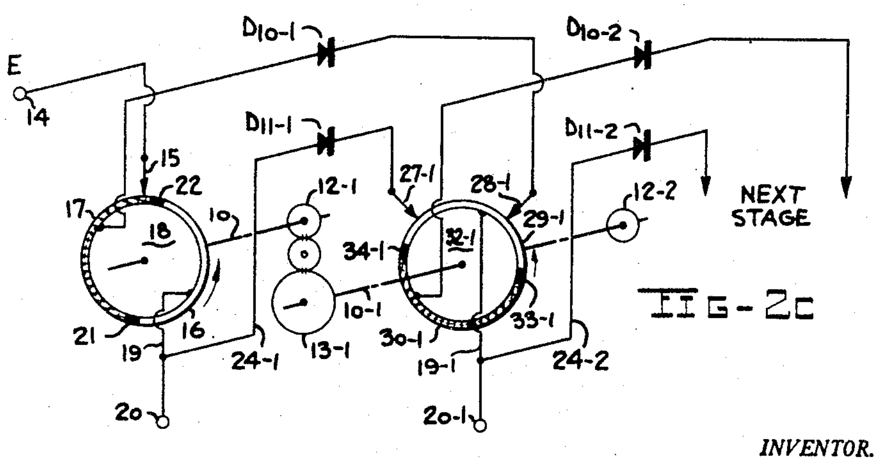

The operation of the counter shown in Fig. 1 can be more readily understood by reference to Figs. 2*a* through 2*c* in conjunction with Fig. 1. Figs. 2*a* through 2*c* illustrate schematically the operation of the switching unit 1 and the first counting unit 2–1 of the counter during two complete revolutions of shaft 10. During these two revolutions, switching ring 18 of switching unit 1 makes two complete revolutions since it is rotated at the same speed as shaft 10, while counting ring 32–1 of counting unit 2–1 makes only one revolution because of the 2:1 speed ratio between gears 12–1 and 13–1.

In the rotative position of the counting rings, as shown in Fig. 1, output terminals 20 and 20–1 each have the voltage, E, thereon indicating, respectively, the binary digits 1, 1. The voltage appearing on output terminal 20 is conducted directly from brush 15 through commutator section 16 and conductor 19. The voltage appearing on terminal 20–1 is connected from conductor 19 through lead 24–1, diode $D_{11-1}$, conductor 26–1, brush 27–1, commutator section 29–1, and conductor 19–1.

Fig. 2*a* is identical to Fig. 1, except that shaft 10 has revolved one-half a revolution or 180° in a counterclockwise direction, with the resulting angular displacements of 180° for switching ring 18, and 90° for the counting ring 32–1 of counting unit 2–1. By inspection it will be observed that no voltage is present on either output terminal 20 or 20–1, the rotational count of shaft 10 thereby corresponding to the binary digits 0, 0.

Fig. 2*b* discloses the operational condition of the counter where shaft 10 has rotated 180° beyond the position shown in Fig. 2*a*. In this instance, output terminal 20 presents the voltage, E, coming by straight conduction through commutator section 16 from source E, whereas terminal 20–1 presents a zero voltage. The output of the two output terminals in the rotational position of the counter shown in Fig. 2*b* represents, respectively, the binary digits 1, 0.

Fig. 2*c* illustrates the effect of shaft 10 having rotated 180° further than that shown for Fig. 2*b*. In this instance, no output signals appear on output terminal 20, whereas the voltage E appears on output terminal 20–1, by direct conduction from commutator section 17 through conductor 23, diode $D_{10-1}$, conductor 25–1, brush 28–1, commutator section 29–1, and conductor 19–1. The two output signals, O, E, on output terminals 20 and 20–1 correspond, respectively, to the binary digits 0, 1.

Another one-half revolution of shaft 10–1 in the same direction of rotation results in another 180° rotation of switching ring 18 and 90° rotation of counting ring 32–1, and their positions are then identical to the positions shown in Fig. 1. Under this condition, the same electrical output signals corresponding to the binary digits 1, 1 will be repeated.

The sequence of signals presented from left to right on terminals 20 and 20–1 must be individually read from right to left as 11, 00, 01, 10, and 11 for Figs. 1, 2*a*, 2*b*, 2*c*, and 1, respectively, in order to have meaning in the binary number system. This results from the fact that counting ring 32–1, by rotating at half the speed of switching ring 18, produces an output signal representing the higher binary digit or most significant digit in the shaft counting sequence.

The signals appearing on terminal 20 indicate half revolutions of shaft 10, inasmuch as each 180° rotation of the shaft produces a change of voltage, each change of voltage indicating a change from one binary digit to another. Thus, the output signal at terminal 20 corresponds to the halves digit of the shaft rotational count in the binary system of numbers, and lies just to the right of the binal point. The binal point in the binary system is equivalent to the decimal point in the decimal system. The relationship of various digits to the binal point in the binary system may be expressed by:

| $(k\times2^4)$ | $(k\times2^3)$ | $(k\times2^1)$ | $(k\times2^0)$ | . |
|---|---|---|---|---|
| (eights) | (fours) | (twos) | (units) | binal point |

| $(k\times2^{-1})$ | $(k\times2^{-2})$ | $(k\times2^{-3})$ |
|---|---|---|
| (halves) | (fourths) | (eighths) |

where *k* is either one of the two digits, 1 or 0, in the binary system. The actual shaft rotation in binary numbers as expressed by the sequence of signals presented by the counter in the examples shown in Fig. 1 and Figs. 2*a*–2*c* may, therefore, be written as 1.1, 0.0, 0.1, 1.0, 1.1, respectively.

The electrical signals at terminal 20–1 correspond to the units digit of the shaft rotation, as each 360° rotation of the shaft produces one voltage change. Terminal 20–2 of counting unit 2–2 presents a change of output signal for each two revolutions of shaft 10–1, and thus presents an indication of the twos digit of the shaft rotational count. The remaining terminals 20–3, 20–4, . . . (**20–*n***) present signals corresponding to the fours digit, the eights digit, . . and the $2^{(n-1's)}$ digit, respectively, of the shaft rotational count in the binary system of numbers.

The detailed operational explanation of the first two sections of the counter, as shown in Fig. 1, could be extended to include succeeding sections. However, the operation of succeeding sections is similar in principle to the operation of the first two sections, except that a speed reduction exists between the switching rings in each section. Table I, given below, indicates the binary count corresponding to the electrical output signals produced at the terminals 20, 20–1, 20–2, and 20–3 (not shown in Fig. 1) for eight revolutions of shaft 10, as well as the final binary number derived from these terminals representing the total number of shaft revolutions.

*Table I*

| Shaft Rotations | Output on terminal 20 | Output on terminal 28–1 | Output on terminal 20–2 | Output on terminal 20–3 | Shaft Rotation in Binary Number Count |
|---|---|---|---|---|---|
| ½ | 1 | 1 | 1 | 1 | 111.1 |
| 1 | 0 | 0 | 0 | 0 | 000.0 |
| 1½ | 1 | 0 | 0 | 0 | 000.1 |
| 2 | 0 | 1 | 0 | 0 | 001.0 |
| 2½ | 1 | 1 | 0 | 0 | 001.1 |
| 3 | 0 | 0 | 1 | 0 | 010.0 |
| 3½ | 1 | 0 | 1 | 0 | 010.1 |
| 4 | 0 | 1 | 1 | 0 | 011.0 |
| 4½ | 1 | 1 | 1 | 0 | 011.1 |
| 5 | 0 | 0 | 0 | 1 | 100.0 |
| 5½ | 1 | 0 | 0 | 1 | 100.1 |
| 6 | 0 | 1 | 0 | 1 | 101.0 |
| 6½ | 1 | 1 | 0 | 1 | 101.1 |
| 7 | 0 | 0 | 1 | 1 | 110.0 |
| 7½ | 1 | 0 | 1 | 1 | 110.1 |
| 8 | 0 | 1 | 1 | 1 | 111.0 |
| 8½ | 1 | 1 | 1 | 1 | 111.1 |

Switching ring 18 of switching unit 1 in Fig. 1 is utilized as a switching connection by placing the voltage, E, alternately on either commutator section 29–1 or 30–1 through the brushes 27–1, 28–1 of counting ring 32–1 in counting unit 2–1. This alternate voltage placement is a prerequisite for securing a change of voltage on output terminal 20–1 for each rotation of shaft 10, and it is this change of voltage on terminal 20–1 that indicates a successively higher rotational count of the shaft 10.

The alternate voltage placement on the two brushes 27–1 and 28–1 contacting switching ring 32–1 of switching unit 2–1 is only one such switching operation incident to the operation of the complete counter. In order to present an output signal indicative of the shaft's rotational count, each counting unit must have an alternate voltage placement at predetermined times on its two brushes contacting its respective counting ring. This alternate voltage placement must come from the previous counting unit, and must be in accordance with the shaft's rotation. Thus, an alternate voltage placement on the two brushes contacting counting ring 32–2 of counting unit 2–2 is required to secure an output count at output terminal 20–2.

This switching operation or alternate brush voltage placement is performed for each brush pair in each counting unit by the counting ring of the immediately preceding counting unit. Hence, a separate switching ring similar to switching ring 18 in switching unit 1 is not required for performing the switching operation for the counting ring of the next successive counting unit. Thus, counting ring 32–1 performs the necessary switching function for counting ring 32–2; counting ring 32–2 for counting ring 32–3, etc. It is the similarity of structure and function between the counting ring in each counting unit, and the switching ring 18 which allows each counting ring to perform the switching operation for the next successive counting ring.

When brush 15 in switching unit 1 contacts insulating segment 22 on switching ring 18, both brushes 27–1 and 28–1 of counting unit 2–1 contact the same commutator section, as may be seen in Figs. 2*a* and 2*c*. Thus, although the voltage E is transferred from one brush to another of the brush pair, no actual voltage switching occurs between the two commutator sections of counting ring 32–1. Hence, since no voltage switching occurs between its two commutator sections, counting ring 32–1 can perform no subsequent switching operation on the counting ring 32–2 of the subsequent counting unit 2–2. Accordingly, switching in any of the subsequent counting units of the entire counter is prevented because of the tandem type of connections between the consecutive counting units. Consequently, whenever brush 15 contacts insulating segment 22 of switching ring 18, inter-commutator section voltage switching does not occur in any of the counting units.

For an indication of half revolutions of shaft 10 at terminal 20, insulating segments 21 and 22 must be sufficiently wide to prevent the short circuiting of commutator segments 16 and 17 by brush 15 so that a proper voltage change may be had on terminal 20 for each half revolution of switching ring 18. However, if indications of half revolutions of the shaft are not desired, terminal 20 may be omitted, and insulating segment 22 may be constructed narrower than brush 15. With this condition fulfilled, brush 15, when in contact with segment 22, short circuits commutator sections 16 and 17. This may be done without affecting the operation of the counter since no switching takes place during the period of contact between segment 22 and brush 15. It is preferable, when no indication of the half revolutions of the shaft is utilized, to construct the insulating segment 22 narrower than brush 15, so that unnecessary interruption of the circuit voltage will be avoided during the period when there is no inter-commutator switching in the counter. The elimination of the circuit voltage interruption will eliminate the ensuing voltage transients. Also, if lights are used to indicate the shaft rotational count, unnecessary blinking will not occur because of the voltage interruption.

The various diodes in Fig. 1 are provided to prevent short circuiting between the output terminals of various counting units whenever the two brushes of any counting unit engage the same commutator section. If the various output terminals were allowed to become shorted, incorrect counts would be produced by the counter during portions of its operation. This may be explained by reference to Fig. 2*c* where terminal 20–1 has the voltage, E, thereon, while terminal 20 has a zero voltage thereon. If diode $D_{11-1}$ were short circuited, the voltage appearing on terminal 20–1 would be conducted directly to terminal 20 through commutator section 29–1, conductor 26–1 and conductor 24–1, thereby allowing an incorrect count to be produced by the counter.

It is clear, from the foregoing description of Fig. 1, that the counting units of the present invention are characterized by their similarity of structure. Accordingly, in order to more clearly point out the distinction between counting units 2–1, 2–2, . . . 2–($n-1$) and the last counting unit **2–*n***, the electrical connections utilized for conductively intercoupling the counting units will be more fully described.

Each of counting units 2–1, 2–2, . . . **2–*n* may be considered to have two input terminals, which correspond respectively to the anodes of the two diodes utilized in the intercoupling of adjacent counting units. In a similar manner, each of the counting units 2–1, 2–2, . . . 2–**($n-1$) may be considered to have two output or switching terminals corresponding respectively to the brushes contacting the two slip rings SR of the associated counting units.

It will be noted that output terminals 20–1, 20–2, . . . 20–($n-1$) are merely connected to the lower switching terminal of the corresponding counting unit by leads 19–1, 19–2, . . . 19–($n-1$), respectively. Therefore, the only difference between the last counting unit 2–$n$ and the preceding counting units is the omission of the two switching or output terminals utilized for applying switching signals to succeeding units. Accordingly each of counting units 2–1, 2–2, . . . 2–($n$—1) may be considered as having two input terminals, two switching terminals and a single output terminal. On the other hand, each of these counting units may be considered to have two input terminals and two output terminals, the output terminals being utilized for interconnecting the associated counting unit with the input terminals of the succeeding counting unit, and one of the output terminals presenting the output signal of the counting unit.

In order to avoid possible ambiguity in terminology, however, it is expeditious to consider the switching terminals of a counting unit as those terminals connected respectively to the input terminals of the next higher order counting unit of a counter, and an output terminal of a counting unit as the terminal at which appears a signal indicating the corresponding digit of the shaft rotation count.

One inherent feature of all counter embodiments of this invention is that sectional variances of angular misalignment caused by play in the gearing system have no cumulative effect in the overall counter operation. In general, this overall misalignment due to play may be tolerated since the variation between any two consecutive counting units will be relatively small, and the rotational speeds of the consecutive counting elements as originally derived from the rotating shaft are reduced progressively down the counter.

In Fig. 1 the rotating shaft 10 upon any reverse rotation, for example, acts to "take up" the play in the gearing system with the result that the latter sections of the counter during this "take up" time are rotated less than would have been the case if no play were present in the gearing system. Considering the $n$th counting ring of Fig. 1, the rotating shaft 10 might, for example, be required to make two complete rotations before the total play between it and the $n$th counting ring were taken up. These same two revolutions of the shaft necessary to take up this amount of play would act to rotate the $n$th counting ring of a counter having no play only $$\left(\frac{2}{2^n}\right)$$

of a revolution. Thus, while the $n$th section of the counter with play would be stationary during the two shaft revolutions, the $n$th counting unit of a counter without play in its gearing system would be revolved only the infinitesimal amount of $$\left(\frac{2}{2^n}\right)$$

of a revolution. The difference of rotation of the $n$th counting unit between the counter with, and the counter without play, is inconsequential as far as affecting the operation of the counter. This example as applied to the $n$th counting unit may be applied to any particular counting ring of the counter without affecting the conclusion reached, providing the play between any two meshing gears is less than ±45°. In practice, this amount of play between any two gears would never be approached.

One feature of the embodiment of the present invention shown in Fig. 1 consists of locating the two brushes contacting each counting ring at a specific optimum angular displacement from each other. The purpose of this optimum displacement is to allow continuous and accurate counting by the counter without introducing errors caused by angular misalignment between the switching ring and any counting ring or between any two counting rings which may be produced in the assembly and manufacture of the counter. In the embodiment shown in Fig. 1, the brushes are located 90° apart, and under this condition, the maximum allowable misalignment between the switching ring and any counting ring, or between any two counting rings in the counter is ±45°, neglecting the finite width of the brushes and insulating segments. The maximum angular misalignment between any two rings, therefore, may lie between the limits of —45°, and +45°, without affecting the counter operation. With reference to Fig. 1, if counting ring 32–1 is misaligned slightly less than 45° counter-clockwise (corresponding to slightly less than —45°) with respect to switching ring 18, the switching function performed by switching ring 18 on counting ring 32–1 is identical to the case shown in Fig. 1 where no misalignment is present. The switching function remains unaffected because the commutator sections 29–1, 30–1 are still contacted by the same respective brushes, 27–1, 28–1. In the same manner, for a misalignment slightly less than 45° in a clockwise direction, or in other words, slightly less than +45°, the switching function performed is identical to the case of no misalignment since the commutator sections are still contacted by the proper brushes.

If the misalignment is greater than ±45°, brushes 27–1 and 28–1 will contact the same commutator section and the counter will thereby produce an inaccurate count. For a binary counter of the type shown in Fig. 1, any increase or decrease from 90° in the angular displacement of a brush pair with respect to each other limits the maximum rotational misalignment allowable between the various switching and counting rings. Therefore, the maximum angular misalignment allowable between any two rings is one-half the brush displacement up to 90°, and one-half the difference between 180° and the brush displacement angle (180°-brush displacement angle) for a brush displacement between 90° and 180°. The placement of the brushes on each counting ring at the optimum angular displacement of 90° from each other results in the maximum allowable angular misalignment between counter rings without affecting the counter operation. Stated differently, the optimum angular brush displacement is one-half the arcuate angle subtended by each commutator section.

This feature of the invention which allows an overall substantial misalignment between the various rings of the counter without affecting its operation makes it possible to connect in tandem a relatively large number of individual counting units. The total number of sections thus joined is limited by the maximum misalignment existing between any two of the counting rings, or between the switching ring and any counting ring. The maximum misalignment in practice may be caused by inaccuracies of manufacture and assembly of the various elements. By maintaining reasonable standards of production, and thereby minimizing inaccuracies of assembly and manufacture, an almost unlimited number of sections may be joined together to form a counter, since play in the gearing system has almost no effect on the counter operation.

As explained previously, the only inter-commutator switching between units of the counter shown in Fig. 1 takes place when brush 15 passes from commutator section 16 to commutator section 17 of the switching rings. However, in order to allow the switching operation to take place, the voltage E, applied to all stages of the counter through brush 15, will be interrupted whenever brush 15 contacts segment 21, thereby leaving a zero voltage on all output terminals. Thus, during this time interval, the output from the counter is inaccurate. If insulating-segment 22 is made narrower than brush 15, the ratio of the time the counter produces a correct answer to the time it produces an incorrect answer is proportional to the ratio of the total combined arcuate lengths of commutator sections 16 and 17, and segment 22, to the length of insulating segment 21. Thus, by constructing a counter in which brush 15 is extremely narrow and segment 21 is only minutely wider than the brush 15, it is possible to limit the time interval an incorrect answer is produced to only an extremely small fraction of each shaft revolution. This operational characteristic is extremely superior to counters employing Geneva gearing systems in which an incorrect answer may be produced for a period as long as 25% of each shaft revolution.

In addition to the structure thus far described in Fig. 1, a warning impulse system is also shown as a portion of switching unit 1. This warning impulse system has particular utility when the counter output is fed into a computer device for producing an electrical impulse at a terminal 44 to warn the computer whenever the answer delivered by the counter is incorrect due to brush 15 being in contact with insulating insert 21 of switching ring 18.

This warning impulse system comprises a warning impulse ring 35 including two arcuate segments 36 and 37 made of insulating material and two conductive inserts 38 and 39 positioned diametrically opposite each other, and axially aligned, respectively, with inserts 21, 22 of switching ring 18. Two brushes, 41 and 42, contact the warning impulse ring and lie on a plane parallel to the edges of inserts 38, 39. Brush 41 is connected by conductor 40 to the voltage source E, while brush 42 is connected by conductor 43 to terminal 44. Brushes 41 and 42 mutually contact the conductive segment 38 at substantially the same instant that brush 15 contacts dielectric segment 21 of switching ring 18 and thereby produce the voltage E on terminal 44 during the time interval of each shaft revolution when the switching operation is taking place in the counter. In this manner, any computer device utilizing the count produced by the counter may be warned of the inaccuracy of the count by a warning signal impulse at terminal 44. Conductive insert 38 is optional, and its presence depends on whether insert 22 of switching ring 18 is shorting or non-shorting, which, in turn, is dependent upon whether an indication of the shaft rotation in half revolutions is desired at terminal 20. If insert 22 is non-shorting or, in other words, is wider than brush 15, and output terminal 20 is utilized, then the computer may be warned when the counter output is inaccurate by utilizing conductive insert 38. However, if terminal 20 is omitted and segment 22 is made narrower than brush 15, then conductive insert 38 is unnecessary and may be omitted.

A variation of this warning apparatus may be produced by making segments 36 and 37 conductive and inserts 38 and 39 insulated, in which case the computer would be warned of the switching period by a zero signal on terminal 44.

Figure 3:
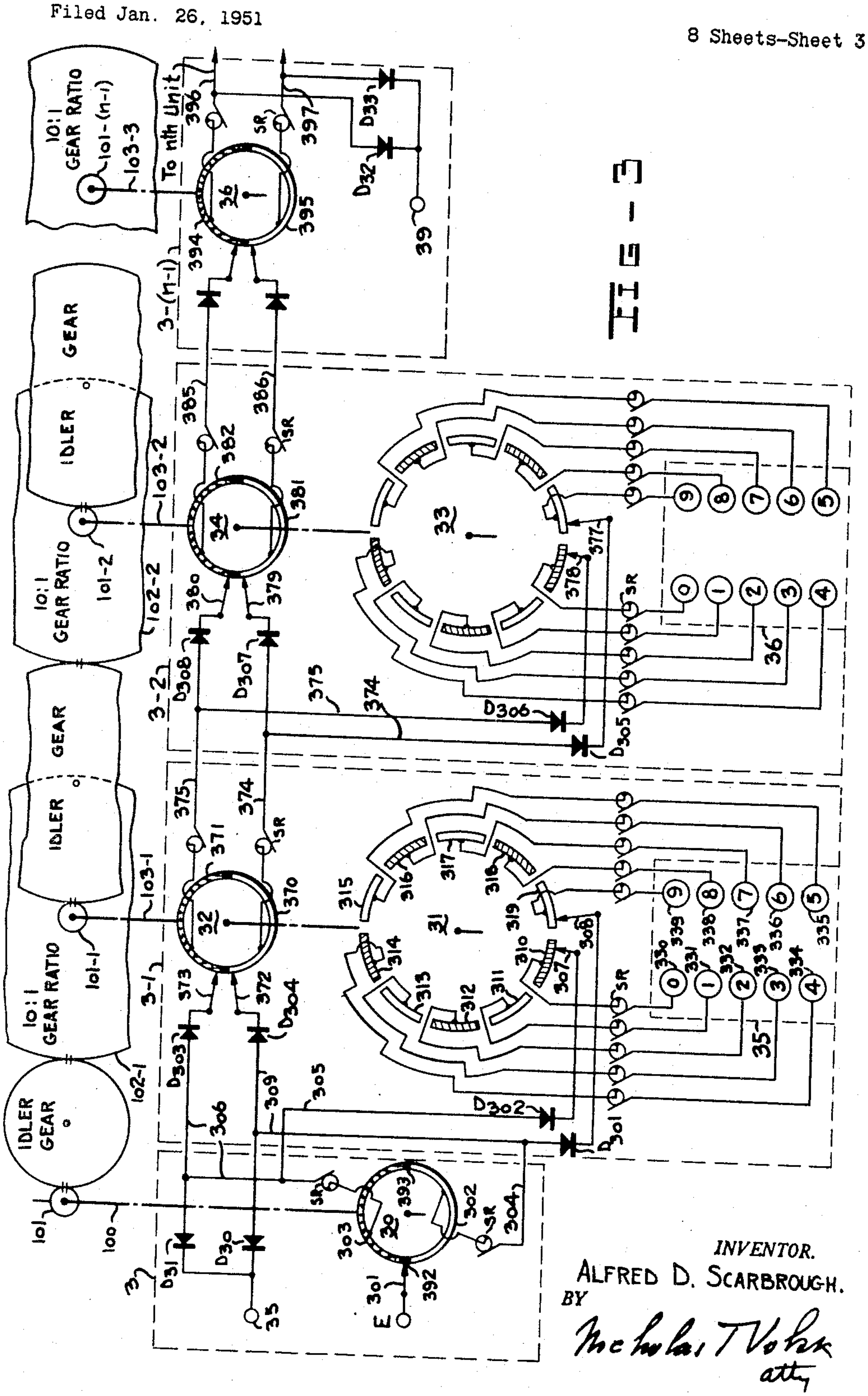
Fig. 3 is a schematic diagram of a decimal counter embodiment of this invention.

Referring now to Fig. 3, there is shown a schematic diagram of a high speed decimal counter employing the electrical commutation principle similar to that shown for the binary counter of Fig. 1. In this embodiment, a switching ring 30 is mounted on a shaft 100 whose rotational count is desired. A driving gear 101 is also mounted on shaft 100 and drives a gear 102–1 through an idler gear at 1/10 the angular velocity of shaft 100. Concentric to and attached to rotate with driven gear 102–1 is a driving gear 101–1 of the same diameter as gear 101. A shaft 103–1 is attached to gear 101–1 and has mounted thereon a counting ring 31 and a switching ring 32 which are rotated therewith at 1/10 the speed of switching ring 30 and shaft 100. A counting ring 33 and a switching ring 34 of a succeeding counting unit 3–2 are rotated at 1/10 the speed of counting ring 31 and switching ring 32 of counting unit 3–1 by a gearing system identical to that shown between switching ring 30 of switching unit 3 and the switching and counting rings of counting unit 3–1.

Counting ring 31 of the first counting unit 3–1 contains ten separate commutator sections designated 310, 311, 312, . . . 319, respectively, each section being electrically insulated from the others. Counting unit 3–1 also contains an output terminal block 35 which encloses ten output terminals 330, 331, . . . 339. A single signal is produced sequentially on these ten output terminals to indicate the decimal units digit of the shaft rotational count. Terminal 330, which represents the zero digit of the shaft rotational count when the voltage E is presented thereon, is connected to commutator section 310 of counting ring 31 by a conductor and a suitable slip ring. Similarly, terminals 331, 332, . . . 339, representing the digits, 1, 2, . . . 9, respectively, are connected to commutator sections 311, 312, . . . 319, respectively, of the counting ring 31 by suitable conductors and slip rings. As was the case for Fig. 1, the individual connections to the various commutator sections of the switching and counting rings take place through slip rings, SR, to allow conductive contact to be made during the rotation of the rings.

Two brushes 307 and 308, respectively, contact counting ring 31 of counting unit 3–1, and are connected to two commutator sections 303, 302, respectively, of switching ring 30 of switching unit 3 in the same manner that the two brushes of the first counting unit 2–1 are connected to the switching unit 1 in Fig. 1. Switching unit 3 of Fig. 3, and switching unit 1 of Fig. 1, are identical and serve the same purpose of switching voltage E between the brushes 307, 308 of the first counting unit 3–1 and from there to various commutator sections of counting ring 31 at time increments determined by the shaft rotation. In the binary counter system disclosed in Fig. 1, each counting ring serves as a switching ring for the subsequent counting ring. In this embodiment, however, counting ring 31 of counting unit 3–1 is incapable of serving as a switching means for the counting ring 33 in the succeeding counting unit 3–2, because its structure and operation is different from the type necessary for the switching operation. Hence, it is necessary to provide in each counting unit a switching ring similar to switching ring 30 which receives its input signals from the switching ring in the preceding counting unit. Counting unit 3–1 thus contains, in addition to the counting ring 31, a switching ring 32, which performs the switching function for the counting ring 33 in the succeeding counting unit 3–2. Switching ring 32 is contacted by a brush 373 connected through a diode $D_{303}$ and conductor 306 to commutator section 303 of switching ring 30, and is contacted by another brush 372 connected through a diode $D_{304}$ and a conductor 309 to commutator section 302 of switching ring 30. A commutator section 371 of switching ring 32 is connected by a conductor 375, a diode $D_{306}$ to a brush 378 contacting counting ring 33, while a commutator section 370 of switching ring 32 is connected by a conductor 374 and a diode $D_{305}$ to a brush 377 contacting counting ring 33.

Switching ring 34 of counting unit 3–2 is identical to the switching ring 32 of counting unit 3–1 and is contacted by two brushes 379 and 380, respectively. Brush 379 is connected through a diode $D_{307}$ to a conductor 374 from switching ring 32 of the preceding counting unit 3–1, while brush 380 is connected through a diode $D_{308}$ to a conductor 375 from switching ring 32. A commutator section 381 of switching ring 34 is connected by a conductor 386, corresponding to conductor 374 of the previous unit, into the next counting unit 3–3 (not shown). In a like manner, commutator section 382 of switching ring 34 is connected by a conductor 385, corresponding to conductor 375 of the preceding counting unit 3–1, to this next counting unit 3–3. The connections between the output terminals of counting unit 3–2, as found in block 36, and the commutator sections of counting ring 33, are identical to the corresponding connections shown in the preceding counting unit 31. Thus, ten output terminals in a terminal block 36 indicate, by the voltage E being present on any one terminal, the tens digit of the number of revolutions made by shaft 100.

Each of the decimal counting units 3–1 and 3–2 may be considered as having two input terminal leads which are connected respectively to the anodes of two pair of input diodes. For example, counting unit 3–1 has two input terminal leads 306 and 309 which are connected to the anodes of input diode pairs $D_{302}$, $D_{303}$ and $D_{301}$, $D_{304}$, respectively. Similarly counting unit 3–2 has two input terminal leads 374, 375 connected respectively to the anodes of input diode pairs $D_{305}$, $D_{307}$ and $D_{306}$, $D_{308}$. Since the anodes of each pair of input diodes of a counting unit are connected together to form a common terminal, the anodes of each input diode pair may be considered as a single input terminal. Thus counting unit 3–1 may be considered as having two input terminals corresponding respectively to the anodes of input diode pairs $D_{301}$, $D_{304}$ and $D_{302}$, $D_{303}$. In a similar manner, counting unit 3–2 may be considered as having two input terminals corresponding respectively to the anodes of input diode pairs $D_{305}$, $D_{307}$ and $D_{306}$, $D_{308}$.

Similar to the counting units of Fig. 1, each of the counting units of Fig. 3 may be further characterized as having two classes of outgoing terminals, output terminals carrying the output signals of the counting unit, and switching terminals utilized for interconnecting a counting unit with the succeeding counting unit. Thus, counting unit 3–1 may be considered as having ten output terminals 330 to 339, inclusive, representing one of the classes of outgoing terminals and including a terminal block 35, and two switching terminals corresponding respectively to the two slip rings SR of the switching ring 32 and representing the other class of outgoing terminals. Similarly, counting unit 3–2 may be considered as having ten output terminals on terminal block 36, and two switching terminals corresponding respectively to the two slip rings SR of the switching ring 34.

Other counting units similar to 3–1, 3–2, may be added to the two stages shown in Fig. 3 to form a computer capable of counting a greater number of shaft revolutions. The angular rotational speed of the counting and switching rings in these additional counting units would be progressively decreased per section by 10:1 increments.

In this embodiment of the present invention, the output signal representing the units digit of the counting is indicated at any instant by a voltage appearing on one of the output terminals 330, 331, 332, . . . 339, of terminal block 35, the particular terminal on which the voltage appears indicating the particular digit. This voltage appears on the particular terminal in each case by straight conduction from the brush 301 of switching ring 30 to the particular commutator section of switching ring 30 contacted, and therefrom to either brush 307 or 308 contacting counting ring 31. The voltage is then applied from the particular brush of the brush pair 307 and 308 having the voltage thereon to the commutator section of counting ring 31 contacted by the particular brush at that instant. In the same manner, the tens digit of the shaft rotation is indicated by a voltage appearing on one of the terminals of block 36 of counting unit 3–2.

No output signal is derived from switching ring 30 as in Fig. 1, since such an output signal would be binary coded and, therefore, meaningless in a decimal coded system. Insulating segment 393 between commutator sections 302 and 303 of switching ring 30 should, therefore, be narrower than brush 15 in the manner mentioned for the insulating segment 22 of the switching ring 18 in Fig. 1. Whenever brush 301 passes from one commutator section to the other over segment 393, no switching occurs between different commutator sections of counting ring 31, in Fig. 1. Thus, there is no interruption of voltage E in the counter sections. Insulating segment 392, however, should be wider than brush 15 inasmuch as switching between the different commutator sections of the various counting rings takes place during its contact with brush 301.

When brush 301 contacts insulating segment 392 of switching ring 30, the voltage E is insulated from the counter, and none of the output terminals of the counter presents a voltage indicating a count. In this instance, the output of the counter is meaningless in contradistinction to the binary embodiment shown in Fig. 1, wherein a zero voltage has a precise meaning. The period that the decimal counter embodiment yields a meaningless answer is governed by the difference in widths between the brush 301 and insulating segment 392, which period may be materially limited by observing reasonable tolerances in the manufacture and assembly of switching ring 30 and brush 301.

If the output of this counter is utilized by a decimal computer device, an impulse warning unit of the type shown for the counter of Fig. 1 may be included to indicate the period of contact between brush 301 and insulating segment 392 of switching unit 3. This impulse warning unit could be attached in switching unit 3 in the manner shown in Fig. 1, and only one conductive insert equivalent to insert 39 in Fig. 1 and aligned with non-shorting insulating insert 392 need be utilized. In the embodiment of this invention shown in Fig. 3, however, a diode "or" gate type of warning unit is shown which may be utilized in either of two different portions of the counter. One of these warning "or" gate circuits is included in switching unit 3, and includes an output terminal 35 connected through a diode $D_{30}$ and conductors 309 to conductor 304. Terminal 35 is also connected through a diode $D_{31}$ and conductor 306 to conductor 305. Diodes $D_{30}$ and $D_{31}$ comprise an "or" gate circuit, and place the potential E on terminal 35 whenever the potential appears on either conductor 304 or 305. This potential is thus presented on terminal 35 whenever brush 301 contacts either commutator section 302 or 303 of switching ring 30. However, when brush 301 contacts insulating segment 392 during the switching period of the counter, a zero voltage is presented by terminal 35 which indicates thereby that the count produced by the various counting units is incorrect.

The impulse warning system in unit 3 gives an indication of the switching period only, and is not capable of indicating any open circuits which might be present elsewhere in the consecutive switching ring connections down the counter due to broken leads, high resistance contacts, or other causes. Such an open circuit existing anywhere between the first switching unit and the final switching ring of the counter would, in turn, cause the counter to produce inaccurate counts of the shaft rotation. To provide a warning of any such open circuit, a warning "or" gate circuit, similar to that described in switching unit 3, may be attached to the two output conductors 396 and 397 leading from the two commutator sections 394 and 395, respectively, of the switching ring 36 in the next to the last counting unit $3_{n-1}$ Leads 396 and 397 are connected to the two brushes contacting the counting ring in the final counting unit (not shown). The potential E will be on one of conductors 396 and 397 at all times, except during the switching period occasioned in switching unit 3. Thus, an output terminal 39 of this warning system will indicate the switching period of switching unit 3 by an absence of voltage, and will also indicate any other difficulty in the counter which acts to interrupt the voltage E in its successive applications to the various switching rings. Thus, this "or" gate warning system gives an indication not only of the switching period but also of any open circuit in the switching circuits which would allow inaccurate operation of the counter. In actual practice, this latter placement of the warning unit would be preferred because of the dual nature of its warning signals.

It is clear, of course, that the warning units shown in Figs. 1 and 3 are functionally equivalent. Accordingly, either a mechanically actuated warning unit or a diode "or" gate warning unit may be utilized with the various embodiments of the present invention.

Each of counting rings 31 and 33 includes ten equal commutator sections, each section subtending an arc of 36°. This commutator section arc allows an optimum angular brush displacement of 18° which, in turn, permits a predetermined maximum angular misalignment due to manufacturing inaccuracies which may exist between the various switching and/or counting rings. The optimum angle of brush displacement, as noted for counting rings 31 and 33, also holds true for the brushes contacting the switching rings 32, 34, inasmuch as angular misalignment between the switching rings will affect the operational accuracy of the entire counter to the same degree as angular misalignment between the various counting rings 31, 33, etc.

As mentioned in connection with Fig. 1, the maximum amount of angular misalignment in the entire counter is equal to plus or minus one-half the optimum brush displacement. Thus, $\pm 9°$ is the maximum angular misalignment which may be tolerated between any two counting rings, or between any counting ring and switching ring, or between any two switching rings without affecting the operation of the decimal counter embodiment of this invention.

Any deviation from this optimum brush displacement of $\pm 18°$ will limit the maximum angular misalignment between any of the switching and the counting rings. Thus, the maximum allowable angular misalignment between any of the switching and counting rings is $\pm \frac{1}{2}$ the brush displacement for a brush displacement up to 18°, and $\pm \frac{1}{2}$ the difference between 36° and the brush displacement for an angular brush displacement from 18° to 36°.

Figure 4:
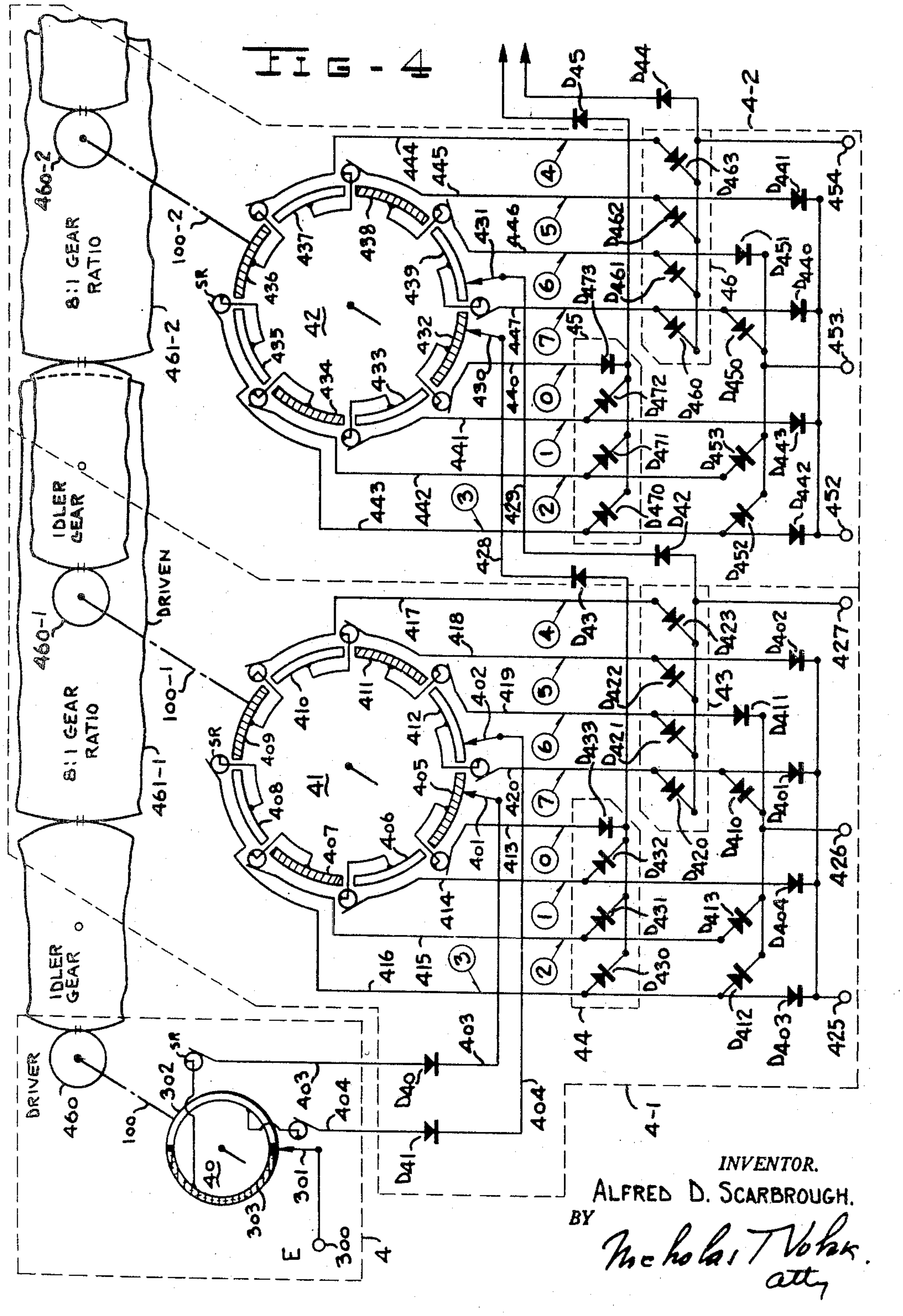
Fig. 4 is a schematic diagram of an octal counter embodiment of this invention.

Referring now to Fig. 4 there is shown another embodiment of this invention in which a shaft rotation is expressed by electrical signals corresponding to digits in the octal system of numbers, these signals being translated instantaneously into signals corresponding to binary numbers by a diode or gating circuits. The binary numbers thus obtained may be more useful for certain types of computer devices than the original octal numbers.

A switching ring 40 of a switching unit 4 is mounted on a shaft 100 whose rotational count is desired. Connected to shaft 100 is a driving gear 460 which drives a driven gear 461–1 through an idler gear at ⅛ the angular rotational velocity of gear 460. A counting ring 41 is mounted on a shaft 100–1 which, in turn, is connected to driven gear 461–1 and is also connected to a driving gear 460–1 of the same diameter as gear 460. Driving gear 460–1 drives another driven gear 461–2 through an idler gear at ⅛ its angular velocity. A counting ring 42 of counting unit 4–2 is mounted on a shaft 100–2 connected to gear 461–2 and is rotated therewith at ⅛ the angular velocity of counting ring 41 and at $\frac{1}{64}$ the velocity of shaft 100.

Switching unit 4 is identical in structure and operation to switching unit 3 of Fig. 3, and its output conductors 403, 404 are connected, respectively, through two diodes $D_{40}$ and $D_{41}$ to two brushes 401 and 402 which contact counting ring 41 of counting unit 4–1. Counting ring 41 contains eight commutator sections electrically insulated from each other, each representing one digit in the octal number system. A commutator section 405 of counting ring 41 is connected to a lead 413 which, when the voltage E appears thereon, gives an indication of the numeral zero. Seven other commutator sections 406, 407, . . . 412, respectively, are connected to seven associated conductors 414, 415, . . . 420, respectively, on which appear the signals representative of the digits 1, 2, . . . 7, respectively. If desired, these conductors may be connected to terminals equivalent to the terminals 330, 331, etc., as shown in block 35 of Fig. 3, and an octal numerical representation of the shaft rotation would be obtained.

In Fig. 4, however, this octal representation of the shaft rotation is transformed by diode or gating circuits into the binary system of numbers. An output terminal 425 presents an electrical signal corresponding to the first binary digit of the shaft rotation expressed in binary numbers and is connected through an "or" gate including four diodes $D_{401}$, $D_{402}$, $D_{403}$, $D_{404}$, respectively, to conductors 420, 418, 416, and 414, respectively. An output terminal 426 presents an electrical signal representing the twos or second binary digit of the shaft rotation and is connected through an "or" gate including four diodes $D_{410}$, $D_{411}$, $D_{412}$, $D_{13}$, respectively, to conductors 420, 419, 416, and 415, respectively. Similarly, an output terminal 427 presents an electrical signal representing the fours digit of the shaft rotation expressed in the binary number system and is connected by an "or" gate including four diodes $D_{420}$, $D_{421}$, $D_{422}$, $D_{423}$, respectively, to conductors 420, 419, 418, and 417, respectively. This diode "or" gate is denoted by a block 43. A diode "or" gate 44 containing four diodes $D_{430}$, $D_{431}$, $D_{432}$, $D_{433}$, respectively, is similarly connected to conductors 416, 415, 414, 413, respectively.

Diode "or" gates 43 and 44 are equivalent to switching ring 32 shown in counting unit 3–2 of Fig. 3. They perform, in an electronic manner, the switching operation for counting ring 42 of the next counting unit 4–2, and eliminate the mechanical switching methods previously shown. Diode switching block 44 is connected by a diode $D_{43}$ and a conductor 428 to a brush 430 contacting counting ring 42, and is thus equivalent to commutator section 371 of switching ring 32 in Fig. 3. The diode switching block 43, besides being connected to terminal 427, is also connected through a diode $D_{42}$ and a conductor 429 to brush 431 of counting ring 42, and hence, is the equivalent of commutator section 370 of the switching ring 72 shown in Fig. 3.

The commutator sections of counting ring 42 are connected to output terminals 452, 453, 454, through diodes arranged in the identical pattern of the diodes shown in counting unit 4–1. In this instance, terminal 452 presents an electrical output signal representing the eights binary digit, terminal 453 the sixteens binary digit, and terminal 454 the thirty-seconds binary digit of the shaft rotational count expressed in binary numbers. The signals appearing on conductors 440, 441, . . . 447 represent, respectively, in the octal system of numbers, the digits 0, 1, . . . 7 of the eights digit of the shaft rotation in the manner that the conductors 413, 414, . . . 420 of counting unit 4–1 present the units digit of the shaft rotational count in the octal number system.

In a manner similar to that employed for the embodiments of Figs. 1 and 3, each of the counting units 4–1 and 4–2 of the embodiment of Fig. 4 may be considered as having two input terminals, which correspond respectively to the anodes of two input diodes, three output terminals carrying the output signals of the counting unit, and two switching terminals utilized for interconnecting the counting unit with the succeeding counting unit. Specifically, counting unit 4–1 may be considered as having two input terminals corresponding respectively to the anodes of input diodes $D_{40}$ and $D_{41}$, three output terminals 425, 426, 427 carrying the output signals of the unit, and two switching terminals corresponding respectively to the cathodes of diodes $D_{430}$ to $D_{433}$, and $D_{420}$ to $D_{423}$. Since the cathodes of diodes $D_{430}$ to $D_{433}$ are connected to a first common terminal lead and the cathodes of diodes $D_{420}$ to $D_{423}$ are connected to a second common terminal lead, it is obviously permissible to consider the cathodes of each of the above referred to groups of diodes as a single terminal. Similarly counting unit 4–2 may be considered as comprising two input terminals corresponding respectively to the anodes of input diodes $D_{42}$, $D_{43}$, three output terminals 452, 453, 454, and two switching terminals corresponding respectively to the common cathode terminal of diodes $D_{470}$ to $D_{473}$ and $D_{460}$ to $D_{463}$.

The counter shown in Fig. 4 can be extended to include other counting sections until limited by angular misalignment between the counting rings. All additional sections would be constructed in the manner shown for counting units 4–1, 4–2, and all would indicate on their respective output terminals progressively greater numbers of rotations of the shaft 100.

The operation of the mechanical switching ring 40 and the counting rings 41, 42, shown in Fig. 4, is essentially the same as for the equivalent portions found in Fig. 3. In this case, however, there are eight commutator sections on each counting ring, each commutator section extending for an arc of approximately 45°. The optimum angular brush displacement in this embodiment is therefore one-half of 45°, or 22½°. With this optimum angular brush displacement, the maximum allowable angular misalignment between any two counting rings or between the switching ring and any counting ring without affecting the operation of the counter is 11.25°. Any deviation from an optimum angular brush displacement of 22.5° will, of course, limit the maximum allowable misalignment between the switching and counting rings.

The manner in which the octal number output from counting ring 41 is transformed into a binary number appearing on the terminals 425, 426, 427 is most readily understood by reference to Table II in which a terminal voltage of zero represents a binary digit zero, and a terminal voltage E represents the binary digit one.

*Table II*

| Octal Number | Corresponding Binary Number | Output on Terminal 427 | Output on Terminal 426 | Output on Terminal 425 |
|---|---|---|---|---|
| 0 | 0 | 0 | 0 | 0 |
| 1 | 1 | 0 | 0 | 1 |
| 2 | 10 | 0 | 1 | 0 |
| 3 | 11 | 0 | 1 | 1 |
| 4 | 100 | 1 | 0 | 0 |
| 5 | 101 | 1 | 0 | 1 |
| 6 | 110 | 1 | 1 | 0 |
| 7 | 111 | 1 | 1 | 1 |
| 0 | 0 | 0 | 0 | 0 |

Table II indicates the transformation of a number from the octal number system into the corresponding binary number system. As an example, the octal number six corresponds to the binary number 110, and is indicated by the counting unit 4–1 when a voltage E appears on terminal 427 through diode $D_{421}$ and on terminal 426 through diode $D_{411}$; and a zero voltage appears on terminal 425, since no diode is connected from conductor 419 to terminal 425. The voltages on the terminals must be read from right to left to secure the proper order for the binary number of the count. Similarly, the transformation of the other octal numbers into their corresponding binary numbers may be understood by referring to Table II and examining the diode connections to the three output terminals from each of the octal number conductors of counting unit 4–1.

It will be noted that since no mechanical switching rings are utilized in the embodiment shown in Fig. 4, the accuracy of the counter is in no manner dependent upon misalignment of the switching apparatus.

An octal counter of the type shown in Fig. 4 is peculiarly adapted to have its output in the octal number system converted into the binary number system since the highest digit in the octal number system is seven, which corresponds to the number 111 in the binary number system. Thus, by having three output terminals, one each for the units, twos, and fours digits of the binary number system, all three terminals are utilized to a maximum extent since each of the three terminals will present both of the binary digits, zero and one, within seven rotations of the shaft.

This conversion characteristic of the octal number system also applies to the quaternary number system, which has a radix of four. A quaternary counter could, therefore, be constructed similarly to the counter of Fig. 3 or Fig. 4, and the output thereof transformed into the binary number system as in the counter of Fig. 4. The highest digit of the quaternary number system is three, corresponding to the binary number eleven and would, therefore, be indicated on two output terminals. A maximum utilization of the two output terminals in this number system conversion would then result.

The system of numbers having the radix sixteen, whose highest digit is fifteen, would likewise be adaptable for maximum conversion efficiency into the binary number system. The decimal number 15 corresponds to the binary number 1111, and the conversion would thus require four final output terminals. Other counters constructed according to this invention counting in number systems whose radix numbers follow the geometric progression indicated by the progression 4, 8, 16, etc. similarly would result in an efficient conversion into the binary number system.

Another advantage in converting the output from counters of the 4, 8, . . . 16 radix number systems into a binary number output is that the binary numbers thus produced by the individual counting units may be read together to indicate, as a whole, the shaft rotational count. The terminals 425, 426, 427, 452, 453, 454 of Fig. 4, for example, produce the units, twos, fours, eights, sixteens, thirty-twos, binary digits, respectively, of the count. However, if gating circuits had been applied to the counter of Fig. 3 to convert the decimal number count into a binary number count, four binary output terminals would be required for each counting unit, since the decimal number 9 is equivalent to the binary number 1001, and the binary numbers thus presented by all counting units could not be read together as a unit, as was possible for the counter of Fig. 4, to indicate the final binary count of the number of shaft rotations. For example, if the actual decimal count were 23, the first counting unit of such a counter would produce a binary number of 0011 corresponding to the decimal number 3, while the second counting unit would produce a binary number of 0010 corresponding to the decimal number 2. These numbers, if read together, would yield a decimal coded binary number of 00110010, while the decimal number 23 corresponds to an actual binary number of 10,111. Thus, in such a decimal number system conversion, the binary output from each counting unit must be considered by itself as being the equivalent of that particular counting units number system conversion. A counter producing this result is found in Fig. 6, and will be described later.

Referring now to Fig. 5, there is shown another form of a binary counter which differs from the binary counter of Fig. 1 in that cam operated switching is employed rather than electrical commutation switching. Also, the successive cams of the counting units are rotated in opposite directions rather than in the same direction as was described in Fig. 1. No change in counter operation occurs by reason of the reverse rotation of the alternate cams involved. However, the circuit connections are slightly different in the case of a counter having its successive cams rotated in the same direction and the case, as here, where the successive cams are rotated in reverse directions. A switching unit 580 contains two cams 508 and 509, which are mounted on a shaft 500 whose rotational count is desired. Switching cam 509 and its associated circuitry perform the same switching function as switching ring 18 of Fig. 1. Cam 509 consists of a first and second dwell separated by a rise and fall, and contacts a cam follower 523 affixed to a conductive lever 522 and causes one end of a lever 522 to alternately contact two switch points 524 and 525. A voltage source not shown, E, is connected by a conductor 513 to lever 522 and is placed thereby on either switch point 524 or 525, depending on the position of cam 509. Switch point 525 is connected to a conductor 527 which, in turn, is connected to a first output terminal 528, while switch point 524 is connected to a conductor 526 which, in turn, is connected to a second output terminal 529.

Cam 508 is the mechanical equivalent of impulse warning ring 35 of Fig. 1, and is useful in certain applications of the counter, as mentioned in connection with Fig. 1. Cam 508 is of a generally circular configuration having two lobes 518 and 519 diametrically opposed to each other. Contacting warning cam 508 is a cam follower 517 coupled to a conductive lever 514. When cam follower 517 is contacted by either of the lobes 518 or 519, one end of conductive lever 514 is moved into contact with switch point 516. Lever 514 is connected to voltage source E by a conductor 515, and upon its engagement with fixed switch point 516, places the voltage E on terminal 520.

A counting cam 510–1 on a shaft 500–1 in a first counting unit 580–1 is driven at one-half the speed of shaft 500 by means of a 2:1 speed ratio between a gear 505 mounted on shaft 500 and meshing with a gear 506–1 mounted on shaft 500–1. Contacting the counting cam 510–1 are two cam followers 538–1 and 548–1 affixed to two conductive levers 539–1, 549–1, respectively. The lever 539–1 is moved by cam follower 538–1 between two switch points 540–1 and 541–1, while lever 549–1 is moved by cam follower 548–1 between two switch points 550–1 and 551–1. Conductive lever 539–1 is connected to conductor 526 of switching unit 580 through a diode $D_{50-1}$, while conductive lever 549–1 is connected to conductor 527 of switching unit 580 through a diode $D_{51-1}$.

Switch points 541–1 and 551–1 are both connected to conductor 532–1 which, in turn, is connected to an output terminal 545–1. Similarly, switch points 540–1 and 550–1 are both connected to conductor 533–1 which in turn is connected to an output terminal 543–1. Conductors 532–1 and 533–1 are also connected to the cathode side of two diodes $D_{50-2}$ and $D_{51-2}$, respectively, which form a portion of a succeeding counting unit 580–2, and correspond to the diodes $D_{50-1}$, $D_{51-1}$, respectively, of counting unit 580–1.

From the foregoing description, it is apparent that the counting unit 580–1 may be considered as having two input terminals corresponding respectively to the anodes of input diodes $D_{50-1}$, $D_{51-1}$, two output terminals 543–1, 545–1 carrying the output signals of the counting unit, and two switching terminals corresponding respectively, to the common terminals of switch points 540–1, 550–1 and 541–1, 551–1 utilized for intercoupling the counting unit to the next succeeding, higher order counting unit. It should be noted that the output terminals 543–1 and 545–1 are respectively connected to the two switching terminals.

As indicated by the broken lines, any number of counting units may be connected in tandem to each other. A final counting section 580–*n* is shown in detail, this section producing an electrical signal corresponding to the $2^n$'s binary digit of the total rotational count of shaft 500.

The operation of the binary counter shown in Fig. 5 is equivalent to the electrical commutation type shown in Fig. 1. In this embodiment of the present invention, switching cam 509 performs the same function as switching ring 18 of Fig. 1, and presents output signals representing half rotations of the shaft in binary numbers. In this embodiment, it will also be noted that each counting section delivers two complementary output signals. For example, each of the output terminals, 529, 545–1, . . . 545–*n* present the voltage E when the binary digit one is indicated as the count of its respective counting unit, and present a zero voltage when the binary count of zero is indicated. The equivalent of the other set of terminals, 528, 543–1, . . . 543–*n* is not found in Fig. 1, but could be placed therein by connecting an equivalent set of terminals to conductors 23–1, 23–2, . . . 23–*n*, respectively. Each of these terminals in Fig. 5 present the voltage E when the binary count of zero is indicated in the respective counting units, and present a zero voltage when the binary count of one is indicated. In other words, pair of terminals 528, 529; 543–1, 545–1; . . . 543–*n*, 545–*n*, presents complementary signals, i. e., when the signal on one terminal of a pair is zero, the signal on the other terminal of the pair must be one. This result is obtained since the particular conductive lever in each counting unit having the voltage E thereon at any instant is able to contact only one fixed switch point at a time. The other fixed switch point of each pair not contacted by the particular lever at the same instant produces a zero voltage. Since certain computer applications require complementary signals of the type produced by the counter shown in Fig. 5, provision for the extra terminals in each counting unit may be desired.

The equal perimeters of the first and second dwells of the identical counting cams, 509, 510–1, . . . 510–*n*, correspond to the equal commutator sections 29–1, 30–1 of counting ring 32–1 in Fig. 1, and the rise and fall of each of the counting cams correspond to insulating segments 21, 22 of counting ring 18 of Fig. 1.

The relative placement and configuration of the projecting elements 518 and 519 on impulse warning cam 508 are such as to cause a conductive lever 514 to contact a switch point 516 during the time interval that lever 522 is being moved by cam 509 from one of its fixed switch points to the other. During this time interval, a signal is delivered on an output terminal 520, which, upon being fed into a computer element, indicates thereto that switching is taking place in the counter. During this transfer period while switching is taking place, the counter may not deliver a correct answer and the computer, thus warned, will not utilize output signals received during this interval.

Cam 508 of the impulse warning system could be constructed so as to have two depressions instead of the two lobes as shown, each depression being shaped similar to an inverted lobe. In such an embodiment, if switch point 516 is placed in a position so as to be continuously contacted by lever 514 during the period of contact between cam follower 517 and the dwell portions of cam 508, a zero voltage warning indication is produced on terminal 520 whenever the cam follower contacts the depressions on the cam. In addition, since the conductive lever is moved into contact with only a single switch point, the connections between the switch point and the conductive lever could be reversed without affecting the operation of the warning system.

The two cam followers in each counting unit should contact their respective cams at an optimum angular displacement of 90° with respect to each other, as described for the brush pairs of Fig. 1. Any deviation from 90° in the angular displacement of these pairs of cam followers reduces the maximum misalignment allowable between any two cams. Therefore, with a 90° angular displacement between the two cam followers in each section, a total maximum angular misalignment of 45° between any two cams of the counter is allowable without interfering with the accuracy of operation thereof. This figure, of course, neglects the finite dimensions of the cam follower and the rise and fall of the cam.

For the conditions of a cam follower displacement other than 90°, the the maximum angular misalignment allowable between any two cams is one-half the cam follower displacement angle up to 90° and one-half (180°-cam follower displacement angle) for a cam follower displacement angle of from 90° to 180°. An angular separation greater than 180° between any two cam followers in the same counting unit will result in inaccurate operation of the counter.

Fig. 5*a* discloses a counting unit 580′–*n* which is a different embodiment of counting unit 580–1 and could be substituted in all counting units of Fig. 5 to form a modified type of cam operated counter. In this instance, each of the conductive lever and cam follower pairs of counting unit 580–1 is subdivided into two similar pairs, resulting in four cam followers contacting the counting cam at four points spaced substantially 90° apart. Thus, cam follower 538–1 and conductive lever 539–1 of Fig. 5 are analogous to a conductive lever **539*a*–1 coupled to cam follower 538*a*–1, and a cam follower 538*b*–1 coupled to conductive lever 539*b*–1, with the cam followers 538*a*–1, 538*b*–1 contacting cam 510–1 at 180° apart. The two switch points 540–1 and 541–1, alternately contacted by conductive lever 539–1 in counting unit 580–1** of Fig. 5, are found in Fig. 5*a* connected as shown. However, in Fig. 5*a*, conductive lever **539*a*–1 is movable by its cam follower 538*a*–1 into and out of contact with switch point 540–1 only, while conductive lever 539*b*–1 is movable by its cam follower 538*b*–1 into and out of contact with switch point 541–1 only. The same division followed for cam follower 538–1 and conductive lever 539–1** in the transition from Fig. 5 to Fig. 5*a* is likewise followed for cam follower 548–1 and conductive lever 549–1.

The internal connections of counting unit 580′–1 of Fig. 5*a* are identical to the connections of counting unit 580–1 of Fig. 5 with respect to corresponding elements and, in addition, conductive levers **539*a*–1 and 539*b*–1** in Fig. 5*a* are connected to each other, as are conductive lever **549*a*–1 and conductive lever 549*b*–1**.

The operation of the counting unit 580′–1 in Fig. 5*a* is similar to the counting unit 580–1 from which it was derived. Inasmuch as counting cam 510–1 is symmetrical with respect to the periods of dwell of its 1st and 2nd lands, it is possible to subdivide cam follower 538–1 and conductive lever 539–1, by way of example, into two separate cam followers and conductive levers as shown in Fig. 5*a* in which the two resulting cam followers contact the cam 510–1 at points diametrically opposite each other. Under this condition, whenever one cam follower is elevated by cam 510–1 into contacting position with its respective switch point, the other cam follower will be depressed out of contacting position with its respective switch point. Since switch points 540–1 and 541–1 may be contacted only by the conductive levers **539*a*–1 and 539*b*–1, respectively, it is readily seen that only one switch point of the two switch points 540–1, 541–1** will be contacted at any given time. Since the levers are connected together, it is apparent that the result obtained in Fig. 5*a* by the pair of conductive levers is identical to the result obtained in Fig. 5 in which a single conductive lever contacts alternately two switch points.

The embodiment shown in Fig. 5*a* discloses the conductive lever attached in an insulated manner to frame 512. This type of attachment is utilized to prevent the various conductive levers from shorting together and thereby rendering the counter ineffective. Also, each conductive lever is mounted so as to bear its respective cam follower against the cam so that the cam follower will follow the contour of the cams during its rotation.

Inasmuch as each conductive lever makes contact with only one switch point in Fig. 5*a*, the respective connections between the conductive levers and switch points could be interchanged without affecting the operation of the counter. Since the only purpose of each conductive lever is to make a single conductive contact no change of function would be obtained by such an interchange.

Referring now to Fig. 6, there is shown a coded decimal counter, according to this invention, which utilizes cam arrangements similar to those shown in Fig. 5.

A switching unit 680, including two cams 508 and 509, respectively, is identical in all respects to the switching unit 580 of Fig. 5. The switching cam 509 and impulse warning cam 508 are mounted on a shaft 600 whose rotational count is desired. The two fixed switch points 524 and 525 of switching unit 680 are connected by conductors 608–1, 610–1, to main conductors 604–1, 605–1, respectively, of a first counting unit 681–1.

Counting unit 681–1 consists of four counting cams, **70*a*–1, 70*b*–1, 70*c*–1, 70*d*–1, and a switching cam 70–1, which are all rotated simultaneously by a shaft 600–1. Shaft 600–1 is connected to a gear 602–1 integral with a gear 603 which, in turn, is driven through an idler gear by a gear 602 connected to shaft 600. Shaft 600–1 is driven at one-tenth the angular velocity of primary shaft 600 by utilizing a 1:10 speed ratio between gears 602 and 603–1. Counting cam 70*a*–1 of counting unit 681–1 is contacted by two cam followers affixed, respectively, to two conducting levers 52*a*–1, 60*a*–1. The conductive lever 52*a*–1 is connected through a diode $D_{60a-1}$ to main conductor 604–1. Similarly, conductive lever 60*a*–1 is connected to main conductor 605–1 through a diode $D_{61a-1}$. Lever 52*a*–1 is adapted to contact either fixed switch point 54*a*–1 or 55*a*–1, while lever 60*a*–1 is adapted to contact either switch point 62*a*–1 or 63*a*–1. Switch points 54*a*–1 and 62*a*–1 are connected to a first output terminal 66*a*–1 while switch points 55*a*–1 and 63*a*–1 are connected to a second output terminal 65*a*–1**.

Each of counting cams **70*b*–1, 70*c*–1, 70*d*–1 also contact two respective cam followers, the followers being affixed to conductive levers in the identical manner described for counting cam 70*a*–1. The electrical connections for each of these counting cam circuits is identical to the connections described for the counting cam 70*a*–1. Counting cam 70*b*–1 produces output signals on output terminals 65*b*–1 and 66*b*–1; counting cam 70*c*–1 output on terminals 65*c*–1 and 66*c*–1; and counting cam 70*d*–1 on output terminals 65*d*–1 and 66*d*–1. Complementary output signals appear on each pair of terminals in the manner described for each pair of terminals shown in Fig. 5. Terminals 66*a*–1, 66*b*–1, 66*c*–1 and 66*d*–1, present the voltage E whenever a binary digit one is indicated, while terminals 65*a*–1, 65*b*–1, 65*c*–1 and 65*d*–1 present the voltage E whenever the binary digit zero is indicated thereon. Cam 70–1 of counting unit 681–1 performs the switching for four counting cams in a second counting unit 681–2 in the same manner that switching cam 509 in switching unit 680 performs the switching for the four counting cams in counting unit 681–1**.

Switching cam 70–1, the mechanical equivalent to switching ring 32 in Fig. 3, contacts a cam follower affixed to a conductive lever 612–1, and also contacts a cam follower affixed to a conductive lever 619–1. Conducting lever 612–1 is adapted to contact either of two switch points 614–1 and 615–1, while conducting lever 619–1 is adapted to contact either of two switch points 621–1 and 622–1. Conducting lever 612–1 is connected through a diode $D_{60-1}$ to main conductor 604–1, while conducting lever 619–1 is connected through a diode $D_{61-1}$ to main conductor 605–1. Fixed switch points 615–1 and 622–1 are connected to a main conductor 605–2 in counting unit 681–2 which corresponds to conductor 605–1 in counting unit 681–1. Switch points 614–1 and 621–1 are connected to a main conductor 604–2 in counting unit 681–2, which corresponds to conductor 604–1 in counting unit 681–1. Switching cam 70–1 of counting unit 681–1 performs the necessary switching function for counting unit 681–2 and similarly, a switching cam 70–2 of counting unit 681–2 performs the switching operation for the next counting unit 681–3, not shown.

Counting unit 681–2 is identical in all respects to counting unit 681–1, except that the four counting cams are rotated at one-tenth the speed of the cams in counting unit 681–1. The cams of counting unit 681–2 are mounted on shaft 600–2 which, in turn, is connected to a gear 602–2 integral with a gear 603–1. Gear 603–1 is driven through an idler gear by gear 602–1, a 10:1 speed ratio existing between gears 602–2 and 603–2. The input connections to the counting unit 681–2 are taken from switching cam 70–1 of switching unit 681–1 in the manner described, and complementary binary output signals, representing the tens digit of the shaft rotation count are presented on four pairs of output terminals associated with each of the four counting cams, respectively, as previously described for counting unit 681–1.

It should be noted that each of the counting units 681–1 and 681–2 of Fig. 6 may be considered as including two input terminals, four output terminal pairs, and two switching terminals. For example, unit 681–1 may be considered as having two input terminals corresponding respectively to the common cathode terminals of input diodes $D_{61-1}$, $D_{61a-1}$, $D_{61b-1}$, $D_{61c-1}$, $D_{61d-1}$, and $D_{60-1}$, $D_{60a-1}$, $D_{60b-1}$, $D_{60c-1}$, $D_{60d-1}$, four output terminal pairs **65*a*–1, 66*a*–1; 65*b*–1, 66*b*–1; 65*c*–1, 66*c*–1; 65*d*–1, 66*d*–1; and two switching terminals corresponding respectively to the common terminals of switch points 614–1, 621–1 and 615–1, 622–1**.

The coded decimal counter of Fig. 6 may include counting units 681–1, 681–2, 681–3, etc. Counting unit 681–1 indicates by electrical signals on the output terminals associated with its respective counting cams, binary numbers equivalent to the decimal number which would express the units digit of shaft 600–1 rotational count. In other words, the counting unit 681–1 counts the units digit of the shaft rotation in decimal numbers, and expresses the corresponding answer in the binary number system. Since the largest decimal digit is 9, and the binary number corresponding thereto is 1001, it is apparent that four output terminals must be utilized to secure this correspondence between the binary and decimal number systems. Output terminals **65*a*–1 and 66*a*–1 of counting cam 70*a*–1 present complementary output signals indicating the ones digit of the binary number corresponding to the units digit of the shaft rotation expressed in the decimal system of numbers. Similarly, terminals 65*b*–1 and 66*b*–1, corresponding to counting cam 70*b*–1, present complementary output signals corresponding to the twos digit of the binary number; terminals 65*c*–1 and 66*c*–1 present complementary output signals corresponding to the fours digit of the binary number; and terminals 65*d*–1 and 66*d*–1** present complementary output signals corresponding to the eights digit of the binary number. This coded decimal counter performs the transformation from the decimal number system into the binary number system in the manner illustrated in Table III.

*Table III*

| Decimal Number | Terminal 66*a*–1 ones digit | Terminal 66*b*–1 twos digit | Terminal 66*c*–1 fours digit | Terminal 66*d*–1 eights digit | Final Binary Number |
|---|---|---|---|---|---|
| 0 | 0 | 0 | 0 | 0 | 0000 |
| 1 | 1 | 0 | 0 | 0 | 0001 |
| 2 | 0 | 1 | 0 | 0 | 0010 |
| 3 | 1 | 1 | 0 | 0 | 0011 |
| 4 | 0 | 0 | 1 | 0 | 0100 |
| 5 | 1 | 0 | 1 | 0 | 0101 |
| 6 | 0 | 1 | 1 | 0 | 0110 |
| 7 | 1 | 1 | 1 | 0 | 0111 |
| 8 | 0 | 0 | 0 | 1 | 1000 |
| 9 | 1 | 0 | 0 | 1 | 1001 |

The shapes of the various counting cams in each counting unit in Fig. 6 differ from each other and may be best explained by reference to Table III. Cam **70*a*–1, must present the consecutive numbers 0, 1, 0, 1, 0, 1 . . . as seen from Table I on terminal 66*a*–1 upon rotation of shaft 600–1**.

This consecutive number pattern indicates that the voltage on terminal **66*a*–1 must change for every 36° rotation of the cam 70*a*–1. In order to secure such a number pattern, counting cam 70*a*–1** has ten distinct dwells, each extending 36° including half the rise and half the fall between adjacent dwells to provide the conductive levers with alternate contact between two contacts. By analogy, this counting cam corresponds to the counting rings of Fig. 3, each of which consist of ten equal commutator sections of 36°.

Counting cam **70*b*–1**, on whose output terminals the twos digit of binary counting appear, must present the consecutive numbers 0, 0, 1, 1, 0, 0, 1, 1, 0, 0, corresponding to the decimal digits of 0, 1, 2, 3, 4, 5, 6, 7, 8, 9, as seen in Table III. Thus, the cam must be of such shape as to produce four consecutive zeros from 8, 9, 0, 1 of the decimal number system, as well as two consecutive ones, two consecutive zeros, and two consecutive ones. Hence, one dwell portion of the cam must be twice the period of any of the other three equal dwell portions.

In the same manner, the shape of counting cam **70*c*–1 is determined from the fourth column of Table III, since it must produce output signals representing the fours digit of the shaft rotational count in binary numbers. Similarly the shape of counting cam 70*d*–1** is determined from the last column in Table III, since it must produce the eights digits.

The optimum cam follower displacement of the decimal coded binary embodiment is the same as the optimum brush displacement of Fig. 3, inasmuch as decimal counting is originally performed. This optimum cam follower displacement of 18° allows a maximum misalignment of ±9° between any two counting cams, or between any two switching cams, or between any counting cam and any switching cam, without affecting the accuracy of the counter operations.

Other coded counters similar to that found in Fig. 6 may be constructed in which number systems other than the decimal number system are transformed into the binary number system. The shapes of the counting cams in each counting unit can be determined by a table similar to Table III, showing the relationship between the particular number system and the binary number system. In addition, electrical commutation of the type shown in Figs. 1, 3, 4, may be substituted for the cam arrangements shown for producing the same results.

Figs. 7 and 7*a* disclose two additional species of counting rings of the type shown in Fig. 1. The embodiments described herein are for use in a binary counter, although other embodiments similar thereto may be constructed for the decimal counter of Fig. 3, the octal counter of Fig. 4, or any equivalent type of counter counting in an *r*-radix number system.

The counting ring of Fig. 7 has two commutator sections 701, 702 separated by two insulating segments 703 and 704. Two brushes 706 and 707 are mounted diametrically opposite each other and contact the commutator sections, and a conductor 708 is affixed to commutator section 701 and a conductor 709 is connected to the commutator section 702. The two commutating sections have a radial overlap for two periods of 90° each; the overlap being the equivalent of the 90° separation of the brushes shown in the embodiment of Fig. 1. Since the brushes diametrically oppose each other at their point of contact, the overlapping of the commutator sections as shown will produce an equivalent result. The 90° overlap is the optimum amount of overlap; any greater or smaller overlap than 90° results in a correspondingly smaller degree of overall misalignment allowable between any two counting rings in the entire system.

If desired, an electrical counting ring could be constructed similar to the one shown in Fig. 7 for use in a counter counting in a number system whose *r*-radix is greater than 2. Such a counting ring would have *r* portions of overlap and would be comprised of *r* commutator sections, each commutator section having an overlap at each end of $$\left(\frac{360}{2r}\right)^\circ$$

corresponding to the optimum angular brush displacement of the electrical commutation type of counters shown in Figs. 3 and 4.

Fig. 7a illustrates another modification of the counting ring shown in Fig. 1 and Fig. 7, in which the brushes are aligned parallel to each other.

Two commutator sections 710 and 711 are electrically separated from each other by dielectric inserts 712 and 713. These two commutator sections have a side-by-side or axial overlap corresponding in length to the dielectric inserts 703 and 704 of Fig. 7. The period of overlap is 90° and corresponds to the optimum brush displacement of 90° for the binary counter shown in Fig. 1, and allows the maximum angular misalignment between any two rings in the counter. Any deviation from the 90° side-by-side overlap limits to a like degree the angular misalignment allowable between the various rings.

A counting ring similar to that shown in Fig. 7a could be constructed for operation of a counter counting in a number system greater than the radix 2. Such a counting ring would have $r$ portions of overlap and would be comprised of $r$ commutator sections, each section having a side-by-side overlap at each end of $$\left(\frac{360}{2r}\right)^{\circ}$$

corresponding to the optimum angular brush displacement of the counters utilizing electrical commutation.

Referring now to Fig. 8, there is shown a decimal counter which performs the same counting function as the counter in Fig. 3, except that cam switching of the general type shown in Fig. 5 is utilized instead of electrical commutation switching.

A switching unit 80 includes a switching cam 809 mounted on a shaft 800 whose rotational count is desired. A voltage source E, not shown, is connected to a conducting lever 812. A cam follower 813 contacting cam 809 is mounted on conductive lever 812 and moves the lever between two switch points 815 and 816. Switch points 815 and 816 are connected to two conductors 819 and 824, respectively, which, in turn, lead into a first counting unit 81. Conductor 819 is connected through a diode $D_{80}$ to a bus 818, and also through a diode $D_{81}$ to a conductor 820. Conductor 824 is connected to bus 825 through a diode $D_{82}$, and is also connected to conductor 826 through a diode $D_{83}$.

Counting unit 82 contains a counting cam 828 having a land 829 extending along the perimeter thereof for a distance which will allow various cam followers contacting cam 828 to be raised for a period of 36° of each rotation of the cam. Counting unit 82 also includes a switching cam 840 similar in structure to switching cam 809. Cams 828 and 840 are mounted on a shaft 801 which, in turn, is connected to a gear 805 integral with a gear 804. Gear 804 is driven through an idler gear by gear 803 which is mounted on shaft 800. A 10:1 speed ratio exists between gears 803 and 804 whereby cams 828 and 840 are driven at one-tenth the speed of shaft 800.

Around the periphery of cam 828 are found ten pairs of cam followers, only three pairs of which are shown. Each of the cam followers is attached to a conductive lever, and each of the cam followers contacts the perimeter of cam 828 at an 18° angular displacement with respect to each other.

The cam follower affixed to conductive lever 830–1 places lever 830–1 in contacting position with a switch point 832–1 during the 36° rotational contact between the cam follower and land 829 during each rotation of cam 828. The cam follower affixed to conductive lever 834–1 makes a similar contact between lever 834–1 and switch point 833–1. Conductive lever 830–1 is connected to bus 818, while conductive lever 834–1 is connected to bus 825. Switch points 832–1 and 833–1 are both connected to a first output terminal 838–1. A shaft rotational count of the decimal digit zero is indicated when the voltage E appears on terminal 838–1.

The next pair of cam followers and the associated conductive levers 830–2 and 834–2, and their associated circuits, are identical to the previous cam pair and provide an indication of the digit one of the shaft's rotational count by presenting a signal on terminal 838–2. Other output terminals (not shown) of counting unit 82, corresponding to the digits 2, 3, 4, . . . 8 of the decimal number system are connected to consecutive pairs of cam followers and associated circuits similar to the pair described, and are disposed clockwise around the perimeter of cam 828. A final output terminal 838–10, corresponding to the decimal digit 10, and its associated circuit is shown, and is likewise similar to the circuit associated with output terminal 838–1.

The switching function for cam 828 is performed by switching cam 809 in switching unit 80, and the counting unit 82 contains a switching cam 840 to perform the necessary switching operation for the counting cam appearing in the next counting unit (not shown) of the counter. Switching cam 840 has two cam followers contacting its periphery, the two cam followers being disposed 18° apart with respect to each other. One cam follower is affixed to conductive lever 841, which, in turn, contacts either of two associated switch point 843 and 844 upon rotation of cam 840. The other cam follower is affixed to conductive lever 846, which, in turn, contacts either of two associated switch point 848 and 849. Conductive lever 841 is connected to conductor 820, while conductive lever 846 is connected to conductor 826. Fixed switch points 843 and 848 are connected to a conductor 852, and fixed switch points 844 and 849 are connected to a conductor 853. Conductors 852 and 853, in turn, are fed in the next counting unit (not shown) and are equivalent to conductors 819 and 824 leading from switching unit 80 to counting unit 82. All of the other counting units, except the final one, would contain a switching cam similar to the switching cam 840 to provide the switching operation for the following counting unit. A 10:1 speed reduction must exist between each consecutive pair of counting units in the manner of Fig. 3.

Counting unit 82 may be considered as including two input terminals corresponding respectively to the common anode terminals of diodes $D_{80}$, $D_{81}$ and $D_{82}$, $D_{83}$; ten output terminals 838–1 to 838–10, respectively, and two switching terminals corresponding respectively to the common terminals of switch points 843, 848 and 844, 849.

The apparatus shown in Fig. 8 will operate in a manner similar to the apparatus shown in both Fig. 3 and Fig. 5. Switching unit 80 will switch the voltage E, according to the rotation of shaft 800, between the buses 818 and 825, which, in turn, place the voltage alternately on the proper conductive levers situated around the perimeter of cam 828. Each of these, in turn, upon rotation of cam 828 places the voltage E on its respective output terminal to indicate thereby the particular units digit of the rotational count of shaft 800.

The angular displacement of 18° of the two cam followers with respect to each other in each of the ten cam pairs is the optimum displacement, and is equivalent to the 18° angular displacement of the brush pair shown in Fig. 3. The maximum amount of angular misalignment between any switching and counting cam, or between any two switching cams, or between any two counting cams, is ±9°, the identical angular misalignment allowable in Fig. 3.

The cam switching arrangement shown in Fig. 8 is essentially a mechanical analogy of the commutation switching arrangement shown in Fig. 3. The land 829 of cam 828 is of such arcuate length as to cause any cam follower an elevation thereon of 36°, and this 36° is equal to and equivalent to the arc of 36° subtended by each of the commutator sections in the counting cams of Fig. 3. Also, the ten cam pairs of Fig. 8 are equivalent to the ten commutator sections of Fig. 3.

Fig. 8*a* discloses a segment of a counting cam in which dwell 829′ is of smaller diameter than the major dwell in contradistinction to the embodiment of Fig. 8, in which dwell 829 was of greater diameter. In addition, the switch points of the counting unit 8′-1 are located so as to be contacted by their respective conductive levers during the period of contact between the cam followers with the major dwell, and are not contacted during the period of contact between the cam followers with the dwell 829′. Thus, in this embodiment, all of the terminals except a particular one at any instant in each counting unit present the potential from the voltage source, the single terminal in each counting unit presenting the zero voltage indicating thereby the count of that particular counting unit.

Since each conductive lever is moved into and out of contact with a single switch point, it is possible in both Figs. 8 and 8*a* to reverse the connections between each conductive lever and its respective switch point without altering the operation of the counter.

Figs. 9 through 12 disclose a structural embodiment of the counter shown schematically in Fig. 5. Referring now to Fig. 9, the counter mechanism is enclosed by end walls 901 and 902, top and bottom walls 903 and 904, and as shown in Fig. 10, side walls 905 and 906.

Cams 508 and 509, together with their associated switching mechanisms, best shown in Figs. 11 and 12, comprise a structural embodiment of the schematic arrangement illustrated in block 580 of Fig. 5. Reference to Fig. 5 is necessary to illustrate the complete wiring connections between various elements of the counter since such wiring is not included in any of the Figs. 9 through 12.

Shaft 900, the rotational count of which is desired, is connected by a coupling 912 to shaft 910 which is free to rotate in bearings 907, 908 mounted in end walls 901 and 902. Keyed to shaft 910 and rotatable therewith is sleeve 914 forming an elongated hub for the gear 505. Cams 508 and 509 separated by spacer 918 are fixed to the sleeve 914 so as to be driven by shaft 900 through shaft 910. This assembled unit is indicated by reference numeral **90*a***.

Rotatably mounted on shaft 911 is an assembled unit 91-1 comprising gear 505-1 having an elongated hub 924-1, upon which is mounted cam 510-1 and gear 506-1. Shaft 911 is positioned in relation to shaft 910 so that gear 505 is in driving engagement with gear 506-1. This mechanical arrangement is schematically shown in Fig. 5 as part of the counting unit 580-1. Each additional counting unit includes a similar gear and cam assembly, which assembly, depending upon its sequential position, is located on shaft 910 or shaft 911 as indicated by reference numerals 91-2, 91-($n-2$), 91-($n-1$), 91-$n$. In this manner, the gear and cam assembly of each counting unit is driven by the preceding unit, and each, in turn, drives the subsequent unit. To reduce wear, engaging pairs of gears are preferably made of dissimilar materials, such as steel and nylon, for example.

A 2:1 speed ratio must exist between each pair of consecutive counting units for a binary counter, hence, the diameter of the driving gears is related to the diameter of the driven gears by a 2:1 ratio. By reason of the 2:1 gearing ratio existing between each section, the rotational speeds of the consecutive elements in relation to the shaft 910 decrease in a geometric progression, and the speed of any counting section is $$\frac{1}{2^k}$$

times the speed of rotating shaft 910 where $k$ is the number of the particular counting unit.

Fig. 10 is a cross-sectional view taken along line 10—10 of Fig. 9, and discloses a cam switching arrangement which may be utilized to secure the output voltages. All conductive levers are preferably constructed of beryllium copper alloy, to provide the necessary conductivity and resilience. Conductive lever 539-($n-1$), forming a portion of a counting unit which would next precede unit 580-$n$, Fig. 5, is insulated from the bottom wall 904 but attached thereto by a screw made of insulating material such as nylon. A roller made of nylon acts as a cam follower 538-($n-1$) for conductive lever 539-($n-1$), and engages cam 510-($n-1$). Another conductive lever 549-($n-1$) is secured to, but insulated from wall 905, and is provided with a cam follower 548-($n-1$) similar to follower 538-($n-1$). Cam follower 548-($n-1$) engages cam 510-($n-1$) at a position spaced 90° in a clockwise direction from cam follower 538-($n-1$). The free end of each of the conductive levers 539-($n-1$) and 549-($n-1$) is positioned to make alternate conductive contact with switch members 946-($n-1$) and 948-($n-1$).

As shown in Fig. 5, fixed switch point 550-1 is connected to switch point 541-1, and switch point 551-1 is connected to switch point 540-1, hence, it is possible to utilize one switch point corresponding to each pair of switch points thus connected. Therefore, L-shaped switch members 946-($n-1$) and 948-($n-1$) are the equivalent of the switch points and their respective connections shown in Fig. 5. Switch members 946-($n-1$) and 948-($n-1$) are attached to, but insulated from bottom wall 904 by a spacer and screws made of insulating material such as nylon.

The conductive levers 539-$n$, 549-$n$; cam followers 538-$n$, 548-$n$; and associated connections for section 91-$n$ are identical in all respects to the conductive levers, cam followers, etc. described for counting unit 91-($n-1$), except in their precise mounting. Conductive lever 539-$n$, and switch members 946-$n$, 948-$n$ are mounted on the top wall 903 of the counter housing, while conductive lever 549-$n$ is mounted on wall 906. All of the cam followers and elements associated with the counting units on shaft 910 are all mounted in this manner shown for this $n$th section, while all of the cam followers and elements associated with the counting units on shaft 911 are mounted in the manner shown for the ($n-1$)th section.

Fig. 11 is a cross-sectional view taken along lines 11—11 of Fig. 9, and discloses in detail the warning cam 508 and the switching structure associated therewith. Cam follower 517 engages the impulse warning cam 508 and is mounted between two flanges depending from conductive lever 514. Conductive lever 514 is secured at one end to the top 903 of the counter housing by a nylon screw in an insulated manner. The other end of conductive lever 514 is moved into contact with fixed switch member 516 whenever the cam follower 517 is engaged by the projections 518, 519 of cam 508. The fixed switch member 516 is secured, in an insulated manner, to the top 903 by a nylon screw.

Fig. 12 is a cross-sectional view taken along lines 12—12 of Fig. 9, and discloses, in detail, the switching cam 509 and the switching structure associated therewith. Switching cam 509 is engaged by cam follower 523 which is mounted between flanges depending from conductive lever 522. One end of conductive lever 522 is secured in an insulated manner to the top 903 of the counter housing by a nylon screw. The other end of conductive lever 522 is adapted to contact either fixed switch member 524 or 525 according to the rotational position of switching cam 509. The switch members 524 and 525 are insulated from each other, but are securely attached to top wall 903 by a screw made of insulating material such as nylon.

Counters capable of counting in the binary, the octal and the decimal system of numbers have thus far been described. However, by using the basic fundamentals presented, it is possible to construct a counter capable of counting in any system of numbers by following the principles disclosed.

In the same manner that the octal counter of Fig. 4 and the coded decimal counter of Fig. 6 counted in their own respective number system, and transformed the count thereof into the binary system, a counter counting in any system of numbers could be adapted to transform its count into the binary number system in either the manner shown in Fig. 4 or Fig. 6.

All counters other than the binary counters constructed according to the principles evolved in this invention require a separate switching unit within each counting unit. In Fig. 3 this switching unit is a rotating electrical commutation type, while the switching unit of Fig. 8 is a rotating cam type, and in Fig. 4 the switching is performed by diode gating circuits. These three types of switching units are considered interchangeable as all perform the same function, and any one may be used with any specific counter. Also, if it were desired to connect a plurality of identical counters to a single shaft, only a single switching means would be necessary to switch for all such counters.

The input voltage E in all embodiments has been described as a voltage source. This voltage source may be a continuous D.-C. potential of the type presented by a battery or a power supply, or in some applications of the counter to computer devices, may be a sharp pulse. Whenever a computer in this latter type of application requires an instantaneous count of the number of shaft rotations, it may automatically receive such a count by placing a voltage pulse on the input terminals. Either a positive or a negative potential source may be utilized in any of the counters, depending upon the particular polarity connection of the various voltage insulating diodes involved.

The direction of rotation of the shaft in all the embodiments of this invention is immaterial, as the counter will count positively in one direction of the shaft rotation and will then subtract from the count thus indicated for the other direction of shaft rotation. The reason that the counter will count for either direction of shaft rotation results from the fact that all counting rings, counting cams, switching rings, and counting rings, etc., are equally well suited for rotation in either direction, and no operational difficulties ensue upon such reverse rotation.

The primary limitation on the number of counting units which may be joined to form any of the counter embodiments of this invention results from the additive effects of the forward resistances of the serially connected diodes. The voltage in passing down the length of the counter is consecutively reduced by the individual voltage drops appearing across the forward resistance of the individual diode elements. When the voltage drop across the total resistance of the forward resistances of these diodes in series approaches the voltage drop across the back resistance of a single diode, then appreciable difficulties are encountered in distinguishing between the two voltage states of O and E. In practice, however, the number of individual sections which may be joined before such limiting effects are reached is sufficient to produce practically infinite shaft rotational counts in ordinary numerical terminology.

Each counter embodiment thus described contains a plurality of counting units and all counting units in each counter embodiment count in the same $r$-radix number system; hence, the terms binary counter, octal counter, decimal counter, etc. Such counter embodiments are useful for normal sequence counting where the information contained in the number of revolutions of a revolving shaft is of the type associated with a sequence count, and consequently, particularly applicable to computers. However, other types of counting might be encountered which would necessitate counters in which the various counting units did not necessarily count in the same $r$-radix number system. Such types of counting might be necessary to count ounces and pounds; seconds, minutes and degrees, or inches, feet and yards, etc.

No difficulty ensues in joining various counting units counting in different number systems to form a unitary counter. If the radix numbers of the 1st, 2nd, . . . $n$th consecutive counting units are mathematically defined as $(a+b)$, $(c+d)$, . . . $(m+n)$, respectively, where $a$, $b$, . . . $n$ are integers, then the radix numbers of the various counting units may all be similar, all different, some similar, some different, etc. In such a counter, the switching cam or ring, and the counting cam or ring, of the 1st, 2nd, . . . $n$th counting units must be rotated at $$\frac{1}{(a+b)}, \frac{1}{(a+b)(c+d)}, \ldots \frac{1}{(a+b)(c+d)\ldots(m+n)}$$

times the speed of the revolving shaft whose rotational count is desired, respectively. The electrical connections between the counting units of such a counter would be identical to the counters shown and described in which all counting units of the specific counter count in the same $r$-radix number system.

A counter, for example, capable of counting inches, feet, and yards, would have a first switching unit rotated at the speed of the revolving shaft. The first counting unit, for counting inches, would count in the 12-radix number system since twelve inches make a foot, and its counting cam or ring and switching cam or ring would be rotated at $\frac{1}{12}$ the speed of the revolving shaft. The second unit for counting feet would count in the 3-radix number system since three feet make a yard, and its counting ring or cam and switching ring or cam would be rotated at $\frac{1}{3}$ the speed of the rings or cams in the first counting unit, and hence, at $\frac{1}{36}$ the speed of the revolving shaft. The third and final counting unit for counting yards need not count in any particular radix number system as was the case for the first two counting units, inasmuch as it need not apply a switching voltage to a next counting unit by a switching ring or cam. If it is desired to count in the decimal number system, then its counting ring or cam must be rotated at $\frac{1}{10}$ the speed of the cams or rings of the second counting unit, and hence at $\frac{1}{360}$ times the speed of the revolving shaft.

What is claimed as new is:

1. A high speed counter adapted to be coupled to a revolving shaft and responsive to an applied electrical potential for producing electrical output signals indicative of the total number of revolutions of the revolving shaft, said counter comprising: 1st, 2nd, . . . $n$th counting units, said 1st, 2nd, . . . $(n-1)$st counting units being coupled respectively to said 2nd, 3rd, . . . $n$th counting units to provide a series chain, each of said counting units having only a first and a second input terminal and at least one output terminal, each of said 1st, 2nd, . . . $(n-1)$st counting units counting in an $r$-radix number system and including a first and a second switching terminal and commutating means for sequentially connecting each of the input terminals of a counting unit to each of the switching terminals thereof and for sequentially connecting each of said input terminals of said unit to each output terminal thereof, said $n$th counting unit including commutating means for sequentially connecting the input terminals of said $n$th unit to each output terminal thereof; switching means including an input terminal for receiving the applied electrical potential, first and second output terminals connected respectively to the first and second input terminals of said 1st counting unit, and commutating means for sequentially connecting the input terminal of said switching means to each output terminal of said switching means to cause the electrical potential to be alternately and sequentially applied to the first and second input terminals of said 1st counting unit; means operable by the shaft for actuating the commutating means of said switching means at a rate proportional to the speed of the revolving shaft and for actuating the commutating means of said counting units at rates proportion to $$\frac{1}{r}, \frac{1}{r^2}, \ldots \frac{1}{r^n}$$

times the speed of the revolving shaft, respectively; and coupling means for connecting the first and second input terminals of each of said 2nd, 3rd, . . . $n$th counting units to the first and second switching terminals, respectively, of the immediately preceding counting unit to cause the electrical potential to be applied to each of said 2nd, 3rd, . . . $n$th counting units exclusively through the immediately preceding counting unit, the output terminals of said counting units carrying signals indicative of progressively higher digits, respectively, of the total number of shaft revolutions.

2. A high speed counter for producing electrical signals indicative of the total number of revolutions of a revolving shaft, said counter comprising: 1st, 2nd, . . . $n$th counting units for counting in an $r$-radix number system, each of said counting units having only a first and a second input terminal and at least one output terminal, each of said 1st, 2nd, . . . $(n-1)$st counting units having, in addition, a first and a second switching terminal and mechanically actuated means for sequentially connecting each of the input terminals of a counting unit to each of said switching terminals of said unit and for sequentially connecting each of said input terminals of said unit to each output terminal of said unit, said $n$th counting unit having, in addition, mechanically actuated means for sequentially connecting each of its input terminals to each output terminal thereof; switching means connected to said first counting unit for conductively connecting a source of potential sequentially to each of the input terminals of said 1st counting unit; means operable by the shaft for actuating said switching means at a rate proportional to the speed of the revolving shaft and for actuating the mechanically actuated means of said counting units, respectively, at rates proportional to $$\frac{1}{r}, \frac{1}{r^2}, \ldots \frac{1}{r^n}$$

times the speed of the revolving shaft; and means for connecting the first and second input terminals of said 2nd, 3rd, . . . $n$th counting units to the first and second switching terminals, respectively, of the immediately preceding counting unit to conductively connect the source of potential to each of said 2nd, 3rd, . . . $n$th counting units solely through the immediately preceding counting unit.

3. A counter for producing electrical signals indicative of the total rotational count of a revolving shaft, said counter comprising: 1st, 2nd, . . . $n$th counting units for counting in an $(a+b)$, $(c+d)$, . . . $(m+n)$ radix number systems, respectively, where $a$, $b$, $c$, . . . $n$ are integers, each of said counting units having only a first and a second input terminal, at least one output terminal for presenting the electrical output signal from the counting unit, and associated rotatable commutating means, each of said 1st, 2nd, . . . $(n-1)$st counting units including, in addition, a first and a second switching terminal energizable by rotation of the associated commutating means; rotatable switching means connected to said 1st counting unit for conductively connecting a source of potential sequentially to each of the first and second input terminals of said 1st counting unit; means operable by the shaft for rotating said switching means at the speed of the revolving shaft and for rotating the commutating means of said counting units at $$\frac{1}{(a+b)}, \frac{1}{(a+b)(c+d)}, \ldots \frac{1}{(a+b), (c+d), \ldots (m+n)}$$

times the speed of the revolving shaft, respectively; and means for connecting the first and second input terminals of each of said 2nd, 3rd, . . . $n$th counting units to the first and second switching terminals, respectively, of the immediately preceding counting unit to conductively connect the source of potential to each of said counting units exclusively through the immediately preceding counting unit, the rotation of said commutating means in each of said counting units producing an output signal indicative of one digit in its respective radix number system of the shaft rotational count.

4. A high speed coded decimal counter for producing electrical signals indicative of the total rotational count of a revolving shaft in the binary number system, said counter comprising: a switching unit having rotatable switching means, an input terminal for receiving an applied potential, and two output terminals; means operable by the shaft for rotating said rotatable switching means at the speed of the revolving shaft, said rotatable switching means upon rotation making alternate conductive contact between said input terminal and said two output terminals; 1st, 2nd, . . . $n$th counting units, each of said counting units including four counting means each having two input terminals, four output terminals connected, respectively, to the said four counting means, and two main conductors; each of said 1st, 2nd, . . . $(n-1)$th counting units including, in addition, rotatable switching means having two input and two switching terminals, and means connecting the two input terminals of each of said four counting means and said rotatable switching means to the two main conductors, respectively; means in said $n$th counting unit connecting the two input terminals of each of the associated four counting means of said $n$th unit to the associated two main conductors thereof, respectively; each of said switching means upon rotation making alternate conductive contact between each of its input terminals and its output terminals; means operable by the shaft for rotating the counting and switching means of said 1st, 2nd, . . . $(n-1)$th counting units at $$\frac{1}{10}, \frac{1}{10^2}, \ldots \frac{1}{10^{n-1}}$$

times, respectively, the speed of the revolving shaft, and for rotating the counting means of the $n$th counting unit at $$\frac{1}{10^n}$$

times the speed of the revolving shaft; means connecting the two output terminals of said switching unit to the two main conductors, respectively, of said first counting unit whereby said potential is alternately connected, applied to the two main conductors of said first counting unit; means connecting the two main conductors of each of said 2nd, 3rd, . . . $n$th counting units to the two switching terminals, respectively, of the switching means in the immediately preceding counting unit to cause said potential to be applied to each of said counting units exclusively through the immediately preceding counting unit; each of the counting means of each counting unit making alternate conductive contact between its output terminal and its two input terminals to cause the plural output terminals in each counting unit to present signals representing binary digits, the set of binary digits thus presented by the counting means in each counting unit representing one numeral in the $r$-radix number system, the $r$-radix numerals thus represented in the 1st, 2nd, . . . $n$th counting units signifying progressively higher numerals to the left of the radix point of the shaft rotational count.

5. A high speed counter for producing electrical signals indicative of the total number of revolutions of a revolving shaft, said counter comprising: 1st, 2nd, . . . $n$th counting units for counting in an $r$-radix number system, each of said counting units having only a first and a second input terminal, each of said 1st, 2nd, . . . $(n-1)$st counting units having, in addition, a first and a second switching terminal and rotatable means coupled between the input terminals of the unit and said switching terminals for sequentially connecting each of said input terminals of said unit to each of said switching terminals of said unit; rotatable switching means connected to said first counting unit for applying a potential sequentially to each of the input terminals of said 1st counting unit; means operable by the shaft for rotating said switching means at the speed of the revolving shaft and for rotating the rotatable means of said 1st, 2nd, . . . $n$th counting units at $$\frac{1}{r}, \frac{1}{r^2}, \ldots \frac{1}{r^n}$$

times the speed of the revolving shaft, respectively; indicating means coupled to the switching terminals of one of said 1st, 2nd, . . . $(n-1)$st counting units to indicate a lack of potential on the switching terminals of said counting unit; and means for connecting the first and second input terminals of each of said 2nd, 3rd, . . . $n$th counting units to the first and second switching terminals, respectively, of the immediately preceding counting unit to cause said potential to be applied to each of said 2nd, 3rd, . . . $n$th counting units solely through the immediately preceding counting unit, the rotation of each of said counting units producing an output signal indicative of at least one digit of the total number of revolutions of the shaft.

6. A high speed counter as defined in claim 5 in which said indicating means includes an 'or" gate circuit having first and second gate input terminals and one gate output terminal, means connecting said first and second gate input terminals to the first and second switching terminals, respectively, of said one of said counting units, said gate output terminals of said "or" gate circuit carrying an electrical signal whenever said potential is present on either one of said switching terminals.

7. A high speed counter for producing electrical signals indicative of the total rotational count of a revolving shaft, said counter comprising: a switching unit having an input circuit, a first and a second output circuit, and rotatable means for sequentially connecting said input circuit to each of said output circuits, said rotatable means including a rotatable switching cam, a cam follower contacting said cam and movable thereby upon rotation of said cam, first and second switching points, and a conductive lever coupled to said cam follower and movable therewith to contact sequentially said switching points, said input circuit of said switching unit being connected to said conductive lever, and said first and second output circuits of said switching unit being connected to said first and second switching points, respectively; means for applying a potential to said input circuit; means operable by the shaft for rotating said rotatable switching cam at the speed of the revolving shaft to apply the potential sequentially to said output circuits; 1st, 2nd, . . . $n$th counting units for counting in an $(a+b)$, $(c+d)$, . . . $(m+n)$ number systems, respectively, where $a, b, \ldots n$ are integers; each of said counting units having only a first and a second input circuit and an output circuit; said 1st, 2nd, . . . $(n-1)$st counting units including switching potential producing means; means for rotating said 1st, 2nd, . . . $n$th counting units at $$\frac{1}{(a+b)}, \frac{1}{(a+b)(c+d)}, \ldots \frac{1}{(a+b)(c+d) \ldots (m+n)}$$

times the speed of said rotating shaft, respectively; means for connecting the first and second output circuits of said switching unit to the first and second input circuits, respectively, of the 1st counting unit, to cause said potential to be applied to said 1st counting unit exclusively from said switching unit; and means for connecting the input circuits of said 2nd, 3rd, . . . $n$th counting units to the switching potential means of the immediately preceding counting unit to cause said potential to be applied to each of said 2nd, 3rd. . . . $n$th counting units exclusively through the immediately preceding counting unit, the rotation of each of said counting units causing signals indicative of a portion of the shaft rotational count to appear on its respective output circuit.

8. A high speed counter for producing electrical signals indicative of the total rotational count of a revolving shaft, said counter comprising: a switching unit having an input circuit, a first and a second output circuit, and rotatable switching means for sequentially connecting said input circuit to each of said output circuits, said rotatable switching means including a rotatable switching ring driven at the speed of the revolving shaft and having only first and second commutator sections electrically insulated from each other, and a brush connected between the input circuit of said switching unit and said switching ring, the first and second output circuits of said switching unit being connected to said first and second commutator sections, respectively; means for applying a potential to the input circuit of said switching unit; means operable by the shaft for rotating said rotatable switching means at the speed of the revolving shaft to apply the potential sequentially to the output circuits of said switching unit; 1st, 2nd, . . . $n$th counting units for counting in an $(a+b)$, $(c+d)$, . . . $(m+n)$ number systems, respectively, where $a, b, \ldots n$ are integers; each of said counting units having a first and a second input circuit and an output circuit; each of said 1st, 2nd, . . . $(n-1)$st counting units including switching potential producing means; means for rotating said 1st, 2nd, . . . $n$th counting units at $$\frac{1}{(a+b)}, \frac{1}{(a+b)(c+d)}, \ldots \frac{1}{(a+b)(c+d) \ldots (m+n)}$$

times the speed of said rotating shaft, respectively; means for connecting the first and second output circuits of said switching unit to the first and second input circuits, respectively, of said 1st counting unit to cause said potential to be applied to said 1st counting unit exclusively from said switching unit; and means for connecting the input circuits of said 2nd, 3rd, . . . $n$th counting units to the switching potential means of the immediately preceding counting unit to cause said potential to be applied to each of said 2nd, 3rd, . . . $n$th counting units exclusively through the immediately preceding counting unit, the rotation of each of said counting units causing signals indicative of a portion of the shaft rotational count to appear on its respective output circuit.

9. A high speed counter as defined in claim 8 and warning means including a warning ring having at least one conductive segment, first and second brushes contacting said warning ring at two points lying on a line substantially parallel to the axis of said warning ring, and an output terminal; means for applying a potential to said first brush; means for rotating said warning ring at the speed of the revolving shaft; and means, connecting said second brush to the output terminal of said warning means whereby the potential is presented by said output terminal as a signal when said first and second brushes contact said conductive segment, said signal indicating the time interval that said rotatable switching means is transferring the potential from one of its output circuits to another one of its output circuits.

10. A high speed counter for producing electrical signals indicative of the total rotational count of a revolving shaft, said counter comprising: 1st, 2nd, . . . $n$th counting units, each of said units having two input and two switching terminals and including rotatable means for alternately connecting each of its input terminals to its switching terminals; means for rotating the rotatable means of said 1st, 2nd, . . . $n$th counting units at $$\frac{1}{2}, \frac{1}{4}, \ldots \frac{1}{2^n}$$

times the speed of the revolving shaft, respectively; rotatable switching means coupled to said 1st counting unit for applying a potential sequentially to each of the two input terminals thereof; means for rotating said switching means at the speed of the revolving shaft; an output terminal coupled to and energizable by said switching means for presenting a signal representing half-value binary digits of the shaft rotational count; and means for connecting the two input terminals of each of said 2nd, 3rd, . . . *n*th counting units to the two switching terminals of the immediately preceding unit, respectively, for applying the potential applied to each of said counting units exclusively from the immediately preceding counting unit, at least one of said switching terminals of said 1st, 2nd, . . . *n*th counting units carrying signals representing the units, two's, four's, . . . $(2^n)$s binary digits, respectively, of the shaft rotational count.

11. A high speed counter as defined in claim 10 including warning means having an input terminal and an output terminal; means for applying a potential to said input terminal of said warning means, and means for rotating said warning means at the speed of the revolving shaft, said warning means during each revolution thereof making conductive contact for at least one time interval between its input and output terminals to place the potential on said output terminal, said one interval being indicative of the time interval that said rotatable switching means is transferring the potential from one to the other of the input terminals of said 1st counting unit.

12. A high speed counter as defined in claim 10, and warning means including a warning ring having at least one conductive segment; first and second brushes contacting said warning ring at two points lying on a line substantially parallel to the axis of said warning ring, and an output terminal; means for applying said potential to said first brush; means for rotating said warning ring at the speed of the revolving shaft; and means connecting said second brush to the output terminal of said warning means, whereby the potential is placed on said output terminal as a warning signal when said first and second brushes contact said conductive segment, said warning signal indicating the time interval that said rotatable switching means is transferring the potential from one to the other of the input terminals of said 1st counting unit.

13. A high speed counter as defined in claim 10, and warning means including a warning cam having at least one projection thereon, an output terminal, a cam follower contacting said warning cam, a switch point connected to said output terminal, and a conductive lever coupled to said cam follower and movable, upon engagement of said projection and said cam follower, into contact with said switch point for a predetermined time interval: means for applying a potential to said conductive lever: and means for rotating said warning cam at the speed of the revolving shaft, said predetermined time interval being indicative of the time interval that said rotatable switching means is transferring the potential from one to the other of the input terminals of said 1st counting unit.

14. A high speed counter for producing electrical signals indicative of the number of revolutions of a revolving shaft, said counter comprising: a switching unit having one input terminal and two output terminals, and rotatable means for making alternate conductive contact between the input terminals and the output terminal of said switching unit; means for applying a potential to said input terminal; means operable by the shaft for rotating said rotatable means at the speed of the revolving shaft so that said potential is alternately applied to said output terminals; 1st, 2nd, . . . *n*th counting units for counting in an $(a+b)$, $(c+d)$, . . . $(m+n)$ number systems, respectively, where $a$, $b$, . . . $n$ are integers, each of said counting units having output terminals and including counting means having two input terminals; each of said 1st, 2nd, . . . $(n-1)$st counting units including, in addition, switching means having two switching terminals; indicating means connected to the two switching terminals of the switching means in one of said counting units for indicating the presence of potential on either one of the output terminals of said switching means, said indicating means including an "or" gate circuit having two input terminals and one output terminal, means connecting the two input terminals of said "or" gate circuit to the two switching terminals of the switching means, respectively, in said one counting unit, the output terminal of said "or" gate circuit producing a potential from said potential source whenever said potential is present on either one of the switching terminals of said switching unit; means operable by the shaft for rotating the counting means of said 1st, 2nd, . . . *n*th counting units at $$\frac{1}{(a+b)}, \frac{1}{(a+b)(c+d)}, \ldots \frac{1}{(a+b)(c+d)\ldots(m+n)}$$

times the speed of the revolving shaft, respectively; internal connection means in each of said 1st, 2nd, . . . $(n-1)$th counting units between its respective switching and counting means; means connecting the two output terminals of said switching unit, respectively, to the two input terminals of the counting means of said 1st counting unit to cause said potential to be alternately applied to said two input terminals in accordance with the rotation of the shaft; means connecting the two input terminals of the counting means of each of said 2nd, 3rd, . . . *n*th counting units to the two switching terminals, respectively, of the switching means in the immediately preceding counting unit to cause said potential to be applied to each of said 2nd, 3rd, . . . *n*th counting units from the immediately preceding counting unit; and conductive means in each counting unit connected to the associated counting means in the same counting unit for applying to the output terminals signals indicative of at least one digit of the total number of shaft revolutions, the signals representative of said one digit and carried by the output terminals of said 1st, 2nd, . . . *n*th counting units representing digits in the $(a+b)$, $(c+d)$, . . . $(m+n)$ number systems, respectively.

15. A high speed counter for producing electrical signals indicative of the total number of revolutions of a revolving shaft, said counter comprising: 1st, 2nd, . . . *n*th counting units for counting in an *r*-radix number system; each of said counting units having a first and a second input terminal and at least one output terminal, each of said 1st, 2nd, . . . $(n-1)$st counting units including a first and a second switching terminal and rotatable connecting means for sequentially connecting each of the input terminals of a counting unit to each of the switching terminals of said counting unit and for sequentially connecting each output terminal of said unit to each of said input terminals thereof, said *n*th counting unit including rotatable connecting means for sequentially connecting each of its input terminals to each output terminal thereof; rotatable switching means connected to said 1st counting unit and responsive to an applied potential for impressing said potential sequentially on each of the input terminals of said 1st counting unit, said switching means including an input terminal for applying said electrical potential thereto, a rotatable switching ring having first and second commutator sections electrically insulated from each other, a brush connected between said rotatable switching ring and the input terminal of said switching unit, and coupling means for coupling said first and second commutator sections to the first and second input terminals, respectively, of said 1st counting unit; means operable by the shaft for rotating said rotatable switching means at the speed of the revolving shaft and for rotating the rotatable connecting means of said counting units, respectively, at $$\frac{1}{r}, \frac{1}{r^2}, \ldots \frac{1}{r^n}$$

times the speed of the revolving shaft; and coupling means for connecting the first and second input terminal of each of said 2nd, 3rd, . . . *n*th counting units to the first and second switching terminal, respectively, of the immediately preceding counting unit to cause said potential to be applied to each of said 2nd, 3rd, . . . *n*th counting units solely through the immediately preceding counting unit, the output terminals of said counting units carrying electrical signals indicative of progressively higher digits, respectively, to the left of the radix point of the total number of shaft revolutions.

16. A high speed counter as defined in claim 15, wherein the rotatable connecting means in each of said 1st, 2nd, . . . $(n-1)$th counting units includes a switching ring having two commutator sections electrically insulated from each other, first and second brushes contacting said switching ring, and means for rotating said switching ring at the speed of rotation of its rotatable connecting means, the two switching terminals of said rotatable connecting means being connected, respectively, to said commutator sections, and said first and second brushes being coupled to the first and second input terminals, respectively, of said counting unit.

17. A high speed counter for producing electrical signals indicative of the number of revolutions of a revolving shaft, said counter comprising: a switching unit having one input terminal and two output terminals, and rotatable means for making alternate conductive contact between the input terminal and the output terminals of said switching unit; means for applying a potential to said input terminal; means operable by the shaft for rotating said rotatable means at the speed of the shaft so that said potential is alternately applied to said output terminals; 1st, 2nd, . . . *n*th counting units for counting in an $(a+b)$, $(c+d)$, . . . $(m+n)$ number systems, respectively, where *a*, *b*, . . . *n* are integers, each of said counting units having output terminals and including counting means having two input terminals; each of said 1st, 2nd, . . . $(n-1)$st counting units including, in addition, switching means having two switching terminals, the switching means in each of said 1st, 2nd, . . . $(n-1)$st counting units including two "or" gate circuits, each of said "or" gate circuits having an output terminal, the output terminals of said "or" gate circuits constituting the switching terminals of said switching means; means operable by the shaft for rotating the counting means of said 1st, 2nd, . . . *n*th counting units at $$\frac{1}{(a+b)}, \frac{1}{(a+b)(c+d)}, \ldots \frac{1}{(a+b)(c+d) \ldots (m+n)}$$

times the speed of the shaft, respectively; internal connecting means in each of said 1st, 2nd, . . . $(n-1)$st counting units between its respective switching and counting means; means connecting the two output terminals of said switching unit, respectively, to the two input terminals of the counting means of said 1st counting unit to cause said potential to be alternately applied to said two input terminals in accordance with the rotation of the shaft; means connecting the two input terminals of the counting means of each of said 2nd, 3rd, . . . *n*th counting units to the two switching terminals, respectively, of the switching means in the immediately preceding counting unit to cause said potential to be applied to each of said 2nd, 3rd, . . . *n*th counting units from the immediately preceding counting unit; and conductive means in each counting unit connected to the associated counting means in the same counting unit for applying signals to the output terminals indicative of at least one digit of the total number of shaft revolutions, the signals representative of said one digit carried by the output terminals of said 1st, 2nd, . . . *n*th counting units representing digits in the $(a+b)$, $(c+d)$, . . . $(m+n)$ number systems, respectively.

18. A counter for receiving an applied electrical potential and for producing electrical signals indicative of the total number of occurrences of a recurring event, said counter comprising: 1st, 2nd, . . . *n*th counting units, counting in an $(a+b)$, $(c+d)$, . . . $(m+n)$ radix number systems, respectively, and having $(a+b)$, $(c+d)$, . . . $(m+n)$ first output terminal sets, respectively, where *a*, *b*, . . . *n* are integers; each of said counting units having, in addition, only two input terminals, a plurality of second output terminal sets, and a plurality of "or" diode gate circuits connected between said first output terminal sets and said second output terminal sets, said second output terminal sets in each of said counting units presenting signals indicative of a portion of the number of occurrences of the recurring event in the binary number system, and each of said 1st, 2nd, . . . $(n-1)$st counting units including two switching terminals, and means coupled between said switching terminals and said two input terminals for sequentially connecting each of the input terminals of a unit to each of the switching terminals thereof; switching means connected to said first counting unit for receiving the applied potential and for applying the potential sequentially to each of the input terminals of said 1st counting unit; mechanical coupling means operable in accordance with the rate of occurrence of the event for actuating the last-named means at said rate of occurrence and for actuating said counting units at $$\frac{1}{(a+b)}, \frac{1}{(a+b)(c+d)}, \ldots \frac{1}{(a+b),(c+d),\ldots(m+n)}$$

times said rate of occurrence, respectively; and means for connecting the two input terminals of each of said 2nd, 3rd . . . *n*th counting units to the two switching terminals, respectively, of the immediately preceding counting unit, whereby said potential is applied to each of said 2nd, 3rd, . . . *n*th counting units solely through the immediately preceding counting unit.

19. A high speed counter for producing electrical signals indicative of the number of revolutions of a revolving shaft, said counter comprising: a switching unit having one input terminal, two output terminals, a rotatable switching ring including first and second commutator sections electrically insulated from each other, a brush connected between said rotatable switching ring and the input terminal of said switching unit, and means connecting the two output terminals of said switching unit to the first and second commutator sections, respectively, for making alternate conductive contact between said input terminal and said output terminals; means for applying a potential to said input terminal; means operable by the shaft for rotating said switching ring at the speed of the revolving shaft so that said potential is alternately applied to said output terminals; 1st, 2nd, . . . *n*th counting units for counting in an $(a+b)$, $(c+d)$, . . . $(m+n)$ number system, respectively, where *a*, *b*, . . . *n* are integers, each of said counting units having output terminals and including counting means having two input terminals; said 1st, 2nd, . . . $(n-1)$st counting units including, in addition, switching means having two switching terminals, and two "or" gate circuits, each of said "or" gate circuits having an output terminal, the output terminals of said "or" gate circuits constituting the switching terminals of said switching means; means operable by the shaft for rotating the counting means of said 1st, 2nd, . . . *n*th counting units at $$\frac{1}{(a+b)}, \frac{1}{(a+b)(c+d)}, \ldots \frac{1}{(a+b)(c+d) \ldots (m+n)}$$

times the speed of the revolving shaft, respectively; internal connecting means in each of said 1st, 2nd, . . .

($n-1$)st counting units between its respective switching and counting means; means connecting the two output terminals of said switching unit, respectively, to the two input terminals of the counting means of said 1st counting unit to cause said potential to be alternately applied to said two input terminals in accordance with the rotation of the shaft; means connecting the two input terminals of the counting means of each of said 2nd, 3rd, . . . $n$th counting units to the two switching terminals, respectively, of the switching means in the immediately preceding counting unit to cause said potential to be applied to each of said 2nd, 3rd, . . . $n$th counting units from the immediately preceding counting unit; and conductive means in each counting unit connected to the associated counting means in the same counting unit for applying signals to the output terminals indicative of at least one digit of the total number of shaft revolutions, the signals representative of said one digit carried by the output terminals of said 1st, 2nd, . . . $n$th counting units representing digits in the $(a+b)$, $(c+d)$, . . . $(m+n)$ number systems, respectively.

20. A high speed counter for producing electrical signals indicative of the total rotational count of a revolving shaft, said counter comprising: a switching unit having an input circuit, a first and a second output circuit, and rotatable means for sequentially connecting said input circuit to each of said output circuits; means for applying a potential to said input circuit; means operable by the shaft for rotating said rotatable means at the speed of the revolving shaft to apply the potential sequentially to said output circuits; 1st, 2nd, . . . $n$th counting units for counting in an $(a+b)$, $(c+d)$, . . . $(m+n)$ number system, respectively, where $a$, $b$, . . . $n$ are integers; each of said counting units having a first and a second input circuit and an output circuit; said 1st, 2nd, . . . ($n-1$)th counting units including switching potential producing means; means for rotating said 1st, 2nd, . . . $n$th counting units at $$\frac{1}{(a+b)}, \frac{1}{(a+b)(c+d)}, \ldots \frac{1}{(a+b)(c+d) \ldots (m+n)}$$

times the speed of said rotating shaft, respectively; means for connecting the first and second output circuits of said switching unit to the first and second input circuits of said 1st counting unit, respectively; means for connecting the input circuits of said 2nd, 3rd, . . . $n$th counting units to the switching potential means of the immediately preceding counting unit to cause said potential to be applied to each of said counting units through the immediately preceding counting unit; warning means having an input terminal and an output terminal; means for applying a potential to the input terminal of said warning means, and means for rotating said warning means at the speed of the revolving shaft, said warning means during each revolution making conductive contact for at least one time interval between its input and output terminals to apply said potential to said output terminal, said one time interval being indicative of the time interval during which said switching unit is transferring the potential from one to the other of its output circuits.

21. A high speed counter for producing electrical signals indicative of the total rotational count of a revolving shaft, said counter comprising: a switching unit having an input circuit, a first and a second output circuit, and rotatable means for sequentially connecting said input circuit to each of said output circuits; means for applying a potential to said input circuit; means operable by the shaft for rotating said rotatable means at the speed of the revolving shaft to apply the potential sequentially to said output circuits; 1st, 2nd, . . . $n$th counting units for counting in an $(a+b)$, $(c+d)$, . . . $(m+n)$ number system, respectively, where $a$, $b$, . . . $n$ are integers; each of said counting units having a first and a second input circuit and an output circuit; said 1st, 2nd, . . . ($n-1$)st counting units including switching potential producing means; means for rotating said 1st, 2nd, . . . $n$th counting units at $$\frac{1}{(a+b)}, \frac{1}{(a+b)(c+d)}, \ldots \frac{1}{(a+b)(c+d) \ldots (m+n)}$$

times the speed of said rotating shaft, respectively; means for connecting the first and second output circuits of said switching unit to the first and second input circuits of the 1st counting unit, respectively; means for connecting the input circuits of said 2nd, 3rd, . . . $n$th counting units to the switching potential means of the immediately preceding counting unit to cause said potential to be applied to each of said counting units through the immediately preceding counting unit; a warning cam having at least one projection thereon, a warning output terminal, a cam follower contacting said warning cam, a switch point connected to said warning output terminal, and a conductive lever coupled to said cam follower and movable, upon engagement of said projection with said cam follower, into contact with said switch point for a predetermined time interval; means for applying a potential to said conductive lever; and means for rotating said warning cam at the speed of the revolving shaft, said predetermined time interval being indicative of the time interval during which said switching unit is transferring the potential from one to the other of its output circuits.

References Cited in the file of this patent

UNITED STATES PATENTS 2,496,585 Harper ---------------- Feb. 7, 1950